(12) United States Patent
Turner

(10) Patent No.: US 12,116,290 B2
(45) Date of Patent: Oct. 15, 2024

(54) SYSTEMS AND METHODS FOR REMOVAL OF CONTAMINANTS FROM A LIQUID

(71) Applicant: BLUE WHALE OCEAN FILTRATION LLC, Dartmouth, MA (US)

(72) Inventor: Daniel Turner, Dartmouth, MA (US)

(73) Assignee: BLUE WHALE OCEAN FILTRATION LLC, Dartmouth, MA (US)

( * ) Notice: Subject to any disclaimer, the term of this patent is extended or adjusted under 35 U.S.C. 154(b) by 362 days.

(21) Appl. No.: 17/623,859

(22) PCT Filed: Jul. 3, 2020

(86) PCT No.: PCT/US2020/040836
§ 371 (c)(1),
(2) Date: Dec. 29, 2021

(87) PCT Pub. No.: WO2021/003474
PCT Pub. Date: Jan. 7, 2021

(65) Prior Publication Data
US 2022/0274852 A1    Sep. 1, 2022

Related U.S. Application Data

(60) Provisional application No. 62/870,755, filed on Jul. 4, 2019.

(51) Int. Cl.
*B63B 35/32* (2006.01)
*C02F 1/00* (2023.01)
(Continued)

(52) U.S. Cl.
CPC ............... *C02F 1/24* (2013.01); *B63B 35/32* (2013.01); *C02F 1/004* (2013.01); *C02F 1/40* (2013.01);
(Continued)

(58) Field of Classification Search
CPC .............. C02F 1/24; C02F 2103/007; C02F 2201/008; B63B 35/32
See application file for complete search history.

(56) References Cited

U.S. PATENT DOCUMENTS 3,326,370 A    6/1967   Riestenberg
3,429,809 A    2/1969   Dotts, Jr.
(Continued)

FOREIGN PATENT DOCUMENTS

CN    101164828 A    4/2008
CN    101716985 A    6/2010
(Continued)

OTHER PUBLICATIONS

Copenheaver, Blaine R., International Search Report and Written Opinion for parent PCT App. No. PCT/US2020/040836, mailed Sep. 16, 2020, 10 pgs., USPTO, Alexandria, VA, USA.
(Continued)

*Primary Examiner* — Bradley R Spies
(74) *Attorney, Agent, or Firm* — John Brooks Law LLC; John J. Brooks, III

(57) ABSTRACT

A liquid treatment system and methods for removing contaminants from a liquid flow is disclosed. The treatment system having a treatment zone, a nanobubble diffuser system and a skimmer cassette assembly configured to remove the nanobubble and contaminant agglomeration from the liquid flow. The nanobubble diffuser system configured to diffuse negatively charged nanobubbles into the liquid flow whereby the nanobubbles adhere to positively charged contaminants and the nanobubble and contaminant agglomeration is urged to float towards a surface of the liquid flow in the treatment zone and be removed by the skimmer cassette assembly. In some embodiments, larger bubble diffuse systems are provided to increase the rise rate of contaminants. In some embodiments, the treatment sys-
(Continued)

tem is a floating vessel. In some embodiments, the treatment system is configured to remove microplastics down to a size of about 1 mm and less.

35 Claims, 21 Drawing Sheets

(51) Int. Cl.
| | | |
|---|---|---|
| *C02F 1/24* | (2023.01) | |
| *C02F 1/40* | (2023.01) | |
| *C02F 103/00* | (2006.01) | |
| C02F 101/30 | (2006.01) | |
| C02F 103/08 | (2006.01) | |

(52) U.S. Cl.
CPC .... *C02F 2101/30* (2013.01); *C02F 2103/007* (2013.01); *C02F 2103/08* (2013.01); *C02F 2201/008* (2013.01)

(56) References Cited

U.S. PATENT DOCUMENTS

| | | |
|---|---|---|
| 3,715,034 A | 2/1973 | Ivanoff |
| 4,033,876 A | 7/1977 | Cocjin et al. |
| 4,060,487 A | 11/1977 | Samsel |
| 4,141,308 A | 2/1979 | Gainey |
| 4,322,294 A | 3/1982 | Price |
| 4,363,735 A | 12/1982 | Hook |
| 4,551,244 A | 11/1985 | Inoue |
| 4,921,605 A | 5/1990 | Chastan-Bagnis et al. |
| 4,959,143 A | 9/1990 | Koster |
| 5,028,325 A | 7/1991 | Hamilton |
| 5,043,064 A | 8/1991 | Abell et al. |
| 5,173,182 A | 12/1992 | Debellian |
| 5,207,901 A | 5/1993 | Ravagnan |
| 5,242,600 A * | 9/1993 | Meylor .................. C02F 3/205 210/197 |
| 54,239,911 | 6/1995 | Zimmerman et al. |
| 5,647,975 A | 7/1997 | Bronnec |
| 6,024,145 A | 2/2000 | Ackles |
| 6,669,841 B2 | 12/2003 | Morin |
| 7,045,058 B2 | 5/2006 | Walczyk |
| 7,485,235 B2 | 2/2009 | Kellett |
| 7,785,035 B2 | 8/2010 | Jarvinen |
| 8,371,245 B2 | 2/2013 | Papadoyianis et al. |
| 9,643,692 B2 | 5/2017 | Covington |
| 9,903,083 B2 | 2/2018 | Lindholm et al. |
| 10,323,376 B1 | 6/2019 | Nickelson |
| 2006/0065586 A1 | 3/2006 | Walczyk |
| 2012/0217206 A1 | 8/2012 | Brown et al. |
| 2015/0090646 A1 | 4/2015 | Sebo et al. |

FOREIGN PATENT DOCUMENTS

| | | |
|---|---|---|
| CN | 101725137 B | 6/2010 |
| CN | 102020004 B | 4/2011 |
| CN | 202414122 U | 9/2012 |
| CN | 104554642 B | 4/2015 |
| CN | 104787226 B | 7/2015 |
| CN | 108911003 B | 11/2018 |
| CN | 109018221 A | 12/2018 |
| DE | 202018003628 U1 | 9/2018 |
| EP | 0231100 A2 | 8/1987 |
| KR | 101070807 B1 | 10/2011 |
| KR | 101860843 B1 | 7/2018 |
| WO | 2015156386 A1 | 10/2015 |
| WO | 2018225889 A1 | 12/2018 |

OTHER PUBLICATIONS

"Bubble Barrier Amsterdam," retrieved from Internet web page <https://www.thegreatbubblebarrier.com/en/amsterdam-en/> on Jul. 17, 2020, 13 pages.

* cited by examiner

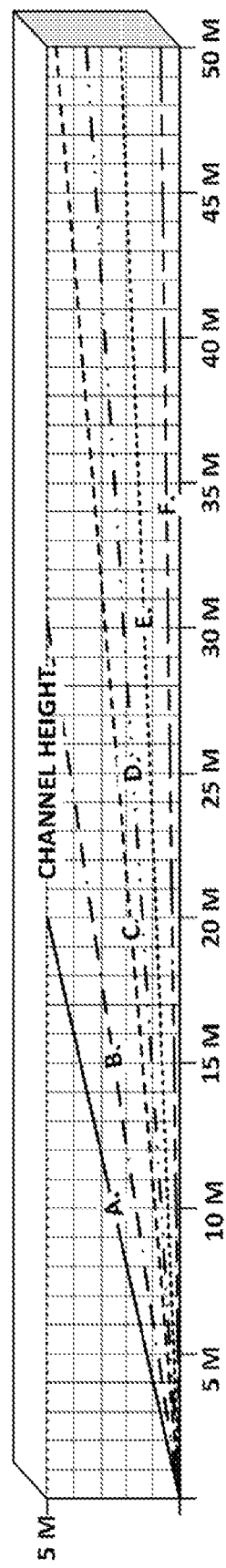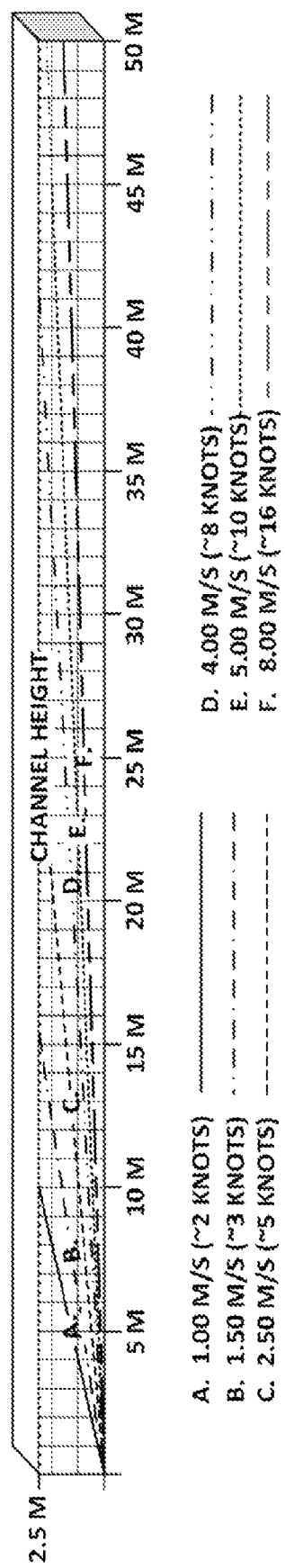
FIG. 13A
FIG. 13B

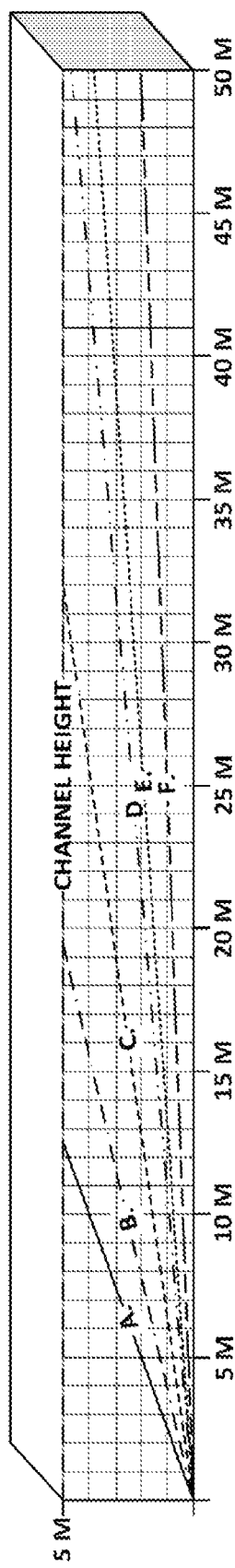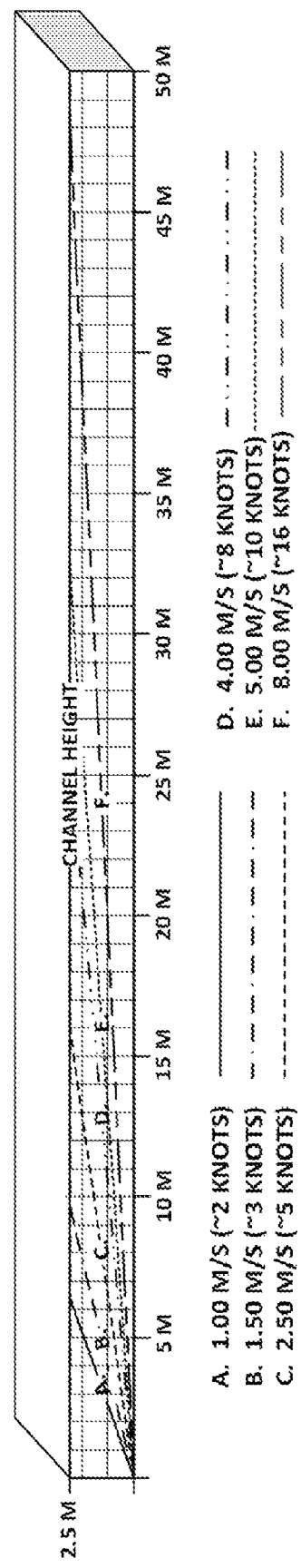
FIG. 14A
FIG. 14B

SYSTEMS AND METHODS FOR REMOVAL OF CONTAMINANTS FROM A LIQUID

CROSS-REFERENCE TO RELATED APPLICATIONS

This application claims the benefit of U.S. App. No. 62/870,755, filed on Jul. 4, 2019, the entire contents of which are incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Technical Field

The disclosed liquid treatment systems and methods relate to treating liquids with air flotation technologies. In some embodiments, the air flotation technologies are nanobubble technologies. In some embodiments, the liquid treatment systems are floating systems.

Background

The world's oceans, lakes rivers and bays have been polluted with the dumping of contaminants such as oil and solid waste for several decades along with mismanaged plastic waste from areas of the world lacking the necessary infrastructure to dispose or recycle the plastic waste such as 3rd world countries. As a result, over 100 million metric tons of inert plastic waste has accumulated in the world's oceans, lakes, harbors, bays and rivers. The floating debris and plastic waste accumulate in ocean gyres and amassing into floating patches of garbage, fishing gear and inert plastic. The inert plastic waste then photodegrades overtime from exposure to the ultraviolet rays of the sun and as a result, breaks down into smaller plastic pieces that further breaks down into microplastic particulate matter that is ingested by fish and aquatic life forms. The microplastic particulate matter also contains toxins which adversely affects marine life & fish within the largest ecosystems on the planet. Larger plastic waste is adversely affecting fish and whale populations. Floating plastic waste is also washed up on land masses, beaches and on the shores of coastlines throughout the world affecting the sustainability of marine life and other associated ecosystems as well.

Over the past decade, there have been several attempts to clean contaminants such as floating debris and inert plastic waste with the use of fishing nets without the effective removal of microplastics. One attempt uses a net or partition suspended by a large floating boom that is propelled by wind and ocean currents to capture or corral the floating plastic waste. The issue with this invention and process approach is that the microplastic waste tends to escape when the boom mounted net as it loads up with plastic waste. The combination of the inability to operate at a speed that exceeds the current speed, the lack of a self-cleaning screen process and an open net design does not effectively remove marine plastics from the water. This combined with the fact that the boom mounted net is only a "passive" filtration process that simply "corrals" the debris and floating waste. The corralled microplastics are then periodically removed by a fishing vessel equipped with a net to remove the captured plastics. The nets used have an open net geometry that is larger than the captured microplastics targeted for removal leaving a vast quantity of marine plastics in the ocean. The boom mounted net does not allow human interface control and renders this technology to be ineffective for the controlled mass removal requirements needed to address this existential threat to the world's oceans sustainability.

Other prior art inventions known by the inventor simply skim the surface of the water for the removal of only floating debris and plastic waste that is at the surface of the water body. It has been proven through numerous studies that marine plastics and microplastics reside down to a depth of approximately 5 meters or 15 feet below the surface.

On Oct. 15, 2019 at the Woods Hole Oceanographic Institution conference on Ocean Microplastics, Dr. Hideshige Takada PhD stated that microplastic removal down to about the 1.0 mm range or less is the most effective range to meet the marine plastics removal rates necessary to prevent further break down into submicron microplastics. Further removal of microplastics in the submicron and nanoparticle range would be classified as diminishing returns of the marine plastics removal requirements and could also have harmful and adverse impact on the ocean biota and microscopic forms of marine life.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

In some embodiments, the liquid treatment systems and methods comprise a multi-hulled filtration vessel for the removal of buoyant contaminants and microplastics from water bodies such as oceans, lakes, rivers, harbors and bays.

One benefit of the disclosed treatment systems and methods is the continuous removal and processing of marine debris and microplastics with a nanobubble infused dissolved air flotation process operating between the hulls of a multi-hulled vessel. The invention resolves complications and issues associated with the known prior art that is incapable of continuously removing microplastics from water bodies down to an acceptable level. Embodiments of the disclosed treatment system may continuously remove the floating debris and marine plastic waste through a controlled screening and flotation process for the removal of microplastics down to the a size of about 25.0 mm or less in some embodiments, 2.0 mm or less in some embodiments and some embodiments may remove down to the 1.0 mm range or less. Embodiments of the treatment systems may also be configured to remove larger sized contaminants and debris.

Some embodiments of the liquid treatment systems may also allow the microplastic removal process to operate at elevated speeds of 3-5 knots or greater with a controlled and automated self-cleaning filtration, flotation and removal process. The self-cleaning screening process combined with the nanobubble infused dissolved air flotation process will also remove microplastics down to the 5 meter depth or greater depending on the sizing of the screens, the depth of the nanobubble infused water distribution manifolds along with the desired operating speed of the vessel.

The relative size of the nanobubbles may be in the 40-200 nanometer (ηm) range. Nanobubbles are also known to carry a negative charge since they give up hydroxyl radicals OH-after the diffusion process. The negatively charged nanobubbles are attracted to the positively charged particles such as microplastics which then attract and adhere to, or otherwise couple with nanobubbles which then agglomerate with other contaminants adhered to nanobubbles. This nanobubble attraction-agglomeration process continues until the agglomeration of contaminants and nanobubbles coagulate and flocculate resulting in enhanced buoyancy. The end result is the flotation of microplastics to the surface of the water achieving higher microplastic removal rates in the dissolved air flotation process. Significant reductions in operating costs are realized since the nanobubble flotation of microplastics occurs without the need for coagulation and flocculation chemicals such as polymers, coagulants or surfactants. The nanobubble infused dissolved air flotation process also minimizes power consumption due the significant reduction in recycle pump recirculation flow rates which are a fraction of the flow rate and pressure requirements of conventional dissolved air flotation systems.

The agglomerated nanobubble and plastic particles float to the surface of the water as a froth to be removed by a skimmer or a plurality of skimmers. An alternative froth removal process is with a flow through band screen or drum screen. One preferred approach is to use the combination of floating skimmers followed by a band screen or drum screen for the highest efficiency of microplastic removal.

In some embodiments, the dissolved air flotation systems are equipped with means for larger bubble diffusion to form a plume of larger bubbles, or a floating blanket, providing increased buoyancy and bubble rise rates for enhanced flotation of contaminants and nanobubble agglomerations. The capability of adjusting the concentration of larger bubbles will allow control to provide enhanced rise rates for contaminant and nanobubble agglomerations. The adjustable control of the floating large bubble blanket rise rate enhances the removal rate of the contaminant and nanobubble agglomeration and faster filter vessel operating speeds. This rise rate control also allows for maximizing the removal efficiency of the microplastic particles and adjustment to remove higher concentrations of marine plastics as well.

In some embodiments, the multi-hulled vessel has a plurality of channels where each channel forms a quiescent treatment zone for a dissolved air flotation process used to float contaminants that are not removed by the self-cleaning screens. In this aspect of the invention, a dissolved air flotation skimmer cassette or a plurality of flotation skimmer cassettes will operate within the channeled space formed within the filter vessel's hull or within the channels formed between the vessel's multiple hulls. The filtration vessel's hull or multiple hulls may also be equipped with a plurality of partition walls configured in longitudinal planes parallel to the hulls or pontoons forming the sides of the dissolved air flotation processes.

In some embodiments, a plurality of flotation skimmer cassettes mounted on floating pontoons operate in the channels that are integral to the vessel's hull or multiple hulls. One benefit of these embodiments is the capability it provides to increase the operating speed of the filtration vessel of which increases the overall mass removal potential of microplastics from the contaminated body of water. The in-hull dissolved air flotation process also increases the process efficiency of the filter vessel due to the elimination of multiple process feed pumps, conventional dissolved air flotation units, excessive internal piping and valves. The in-hull dissolved air flotation process significantly reduces the costs of installing and operating multiple conventional dissolved air flotation systems on the deck or a plurality of decks of the filter vessel. The dissolved air flotation skimmer cassettes that float on a set of pontoons and equipped with lifting mechanisms to raise or elevate the flotation skimmer cassettes from the water for inspection, maintenance or to allow increased filter vessel travel speeds.

In some embodiments, a flow through self-cleaning band screen or a drum screen is located downstream after the nanobubble infused dissolved air flotation process to assure removal of agglomerated contaminants such as plastic waste down to the 25.0 mm or better, in some embodiments down to the 2.0 mm range or better and some embodiments may remove contaminants down to the 1.0 mm range or better.

In one example embodiment, a treatment system to remove contaminants from a liquid flow is provided comprising a treatment zone defined by a channel and a depth, the channel defined by one or more channel guide configured to channel the liquid flow from an entrance of the treatment zone to an exit of the treatment zone, the liquid flow comprising contaminants having a positive charge, a nanobubble diffuser system configured to be submerged in the liquid flow to the depth, the depth defining a bottom of the treatment zone, the nanobubble diffuser system configured to diffuse a plurality of nanobubbles having a negative charge into the liquid flow whereby the nanobubbles adhere to the contaminants as a nanobubble and contaminant agglomeration and the nanobubble and contaminant agglomeration is urged to float towards a surface of the liquid flow in the treatment zone, and a skimmer cassette assembly configured to remove the nanobubble and contaminant agglomeration from the liquid flow whereby a volume of contaminants in the liquid flow is a lower volume at the exit of the treatment zone than at the entrance of the treatment zone. In some embodiments, the liquid flow is from a larger liquid source, and the channel guide and the nanobubble diffuser system are operably coupled to a vessel floating in the larger liquid source. In some embodiments, the liquid flow is from a larger liquid source, a rate of liquid flow through the channel is defined by a movement of the channel through the larger liquid source, and a position of the skimmer cassette assembly relative to the nanobubble diffuser system defined by a rise rate of the nanobubbles, a rate of liquid flow through the channel and the depth. In some embodiments, the treatment system further comprises a larger bubble diffuser system positioned proximal to the bottom of the treatment zone in and in a downstream direction of the liquid flow from the nanobubble diffuser system, and the larger bubble diffuser system configured to diffuse a plurality of large bubbles in the liquid flow whereby the plurality of large bubbles create a floating blanket of large bubbles to increase a rise rate of the nanobubble and contaminant agglomeration. In some embodiments, a spacing of the nanobubble diffuser system relative to the skimmer cassette assembly is based on a rise rate of the nanobubble and contaminant agglomeration. In some embodiments, the skimmer cassette assembly comprises a skimmer blade coupled to a skimmer drive whereby the skimmer drive is configured to move the skimmer blade in a relative movement to the liquid flow, the relative movement of the skimmer blade is in an opposite direction to the liquid flow, and the skimmer blade is configured to extend from the surface of the liquid flow to a skimming depth whereby the skimmer blade engages the nanobubble and contaminant agglomeration from the liquid flow to the skimming depth and moves the contaminants in the liquid flow in the opposite direction to the liquid flow. In some embodiments, the skimmer cassette assembly further comprises a skimmer beach assembly having an inclined beach surface whereby the contaminants are moved up the inclined beach surface and out of the liquid flow as the skimmer blade moves over the inclined beach surface. In some embodiments, the skimmer assembly further comprises an augur channel in an inclined beach surface whereby the contaminants are deposited in the augur channel as the skimmer blade moves over the inclined beach surface, an augur positioned in the augur channel configured to remove the contaminants from the augur channel, and a wave suppression edge formed into a leading edge of the skimmer beach assembly to suppress turbulence in the treatment zone.

In some embodiments, the treatment system further comprises a plurality of large contaminants in the liquid flow, one or more trash screens positioned in an upstream direction from the nanobubble diffuser system whereby the one or more trash screens remove a portion of the large contaminants from the liquid flow, and one or more band screens or drum screens positioned in a downstream direction from the nanobubble diffuser system whereby the one or more band filters further remove the contaminants from the liquid flow.

In some embodiments, a volumetric flow rate of liquid flow is greater than about 1 cubic meter per second for each meter width of the channel of the treatment zone and each meter depth of the treatment zone, and a volume of the contaminants in the liquid flow at the exit of the treatment zone is at least about 50 percent lower in volume than the contaminants in the liquid flow at the entrance of the treatment zone. In some embodiments, the depth of the treatment zone is about 5 meters. In some embodiments, the contaminants comprise microplastics having a size of less than about 25.0 mm.

In some embodiments, a volumetric flow rate of liquid flow is greater than about 3 cubic meters per second for each meter width of the channel of the treatment zone and each meter depth of the treatment zone, the contaminants comprise microplastics having a size of less than about 25.0 mm, and a volume of the contaminant in the liquid flow at the exit of the treatment zone is at least about 90 percent lower in volume than the contaminant in the liquid flow at the entrance of the treatment zone. In some embodiments, the depth of the treatment zone is about 5 meters. In some embodiments, the contaminants comprise microplastics having a size of less than about 25.0 mm.

In one example embodiment, a floating skimmer cassette assembly for use with a liquid treatment system to filter a liquid flow is provided comprising a skimmer blade operationally coupled to one or more skimmer cassette pontoon whereby the skimmer blade is positioned near a surface of the liquid flow, the skimmer blade operationally coupled to a skimmer drive whereby the skimmer drive is configured to move the skimmer blade in a relative movement to the liquid flow, the relative movement of the skimmer blade is in an opposite direction to the liquid flow, and the skimmer blade is configured to extend from the surface of the liquid flow to a skimming depth whereby the skimmer blade engages a contaminant from the liquid flow at the skimming depth and moves the contaminant in the liquid flow in the opposite direction to the liquid flow. In some embodiments, the floating skimmer cassette assembly further comprises a skimmer beach assembly having an inclined beach surface whereby the contaminant is moved in the opposite direct to the liquid flow, up the inclined beach surface and out of the liquid flow as the skimmer blade moves over the inclined beach surface. In some embodiments, the skimmer beach assembly further comprises an augur channel in the inclined beach surface whereby the contaminant is deposited in the augur channel as the skimmer blade moves over the inclined beach surface, an augur positioned in the augur channel and configured to remove the contaminant from the augur channel, and a wave suppression edge formed into a leading edge of the floating skimmer beach assembly to suppress turbulence in the liquid flow.

In one example embodiment, configurable liquid treatment system for removing contaminants from a liquid flow is provided comprising a treatment zone defined by a channel width, a depth and a length, the channel width defined by one or more channel guide configured to channel the liquid flow from an entrance of the treatment zone to an exit of the treatment zone, a nanobubble diffuser system configured to be submerged in the liquid flow to the depth, the depth defining a bottom of the treatment zone, a skimmer cassette assembly at a position from the entrance of the treatment zone and defining the length of the treatment zone, the liquid flow comprising contaminants having a positive charge, the nanobubble diffuser system configured to diffuse nanobubbles having a negative charge into the liquid flow whereby the nanobubbles adhere to the contaminants as a nanobubble and contaminant agglomeration and the nanobubble and contaminant agglomeration is urged to float towards a surface of the liquid flow in the treatment zone, and the skimmer cassette assembly is configured to remove the nanobubble and contaminant agglomeration from the liquid flow whereby a volume of contaminants in the liquid flow is a lower volume at the exit of the treatment zone than at the entrance of the treatment zone. In some embodiments, a position of the skimmer cassette assembly relative to the nanobubble diffuser system is defined by a rise rate of the nanobubbles, a liquid flow rate of the liquid flow through the channel width and the depth. In some embodiments, the liquid flow is flowing at a volumetric flow rate of greater than about 1 cubic meter per second for each meter of the channel width of the treatment zone and each meter depth of the treatment zone. In some embodiments, the liquid flow is flowing at a volumetric flow rate of greater than about 3 cubic meters per second for each meter of the channel width of the treatment zone and each meter depth of the treatment zone. In some embodiments, the liquid flow is flowing at a volumetric flow rate of greater than about 1 cubic meter per second for each meter of the channel width of the treatment zone and each meter depth of the treatment zone, the contaminants comprise microplastics having a size of less than about 25.0 mm, and the volume of contaminants in the liquid flow is at least about 50 percent lower in volume at the exit of the treatment zone than at the entrance of the treatment zone. In some embodiments, the liquid flow is flowing at a volumetric flow rate of greater than about 3 cubic meters per second for each meter of the channel width of the treatment zone and each meter depth of the treatment zone, the contaminants comprise microplastics having a size of less than about 25.0 mm, and the volume of contaminants in the liquid flow is at least about 90 percent lower in volume at the exit of the treatment zone than at the entrance of the treatment zone.

In one example embodiment, a filter ship comprising two or more hulls forming one or more channel where water contaminated with contaminants can be removed is provided, the filter ship comprising a nanobubble diffuser system configured to disperse nanobubbles of air into a channeled water stream flowing between the two or more hulls to adhere microbubbles to the contaminants and create contaminants and nanobubble agglomerations, the two or more hulls defining one or more channel, a larger bubble diffuser system configured to disperse a blanket of larger air bubbles at a point downstream of the nanobubble diffuser system to increase a rise rate of the contaminants and nanobubble agglomerations, and wherein a ratio of dispersed contaminants and nanobubble agglomerations to that of the blanket of larger bubbles can be varied and controlled to adjust and control the rise rate of the contaminants and nanobubble agglomeration. In some embodiments, the filter ship further comprises one or more floating skimmer cassette assembly located within the one or more channel, the one or more floating skimmer cassette assembly positioned downstream of the nanobubble diffuser system, and each of the one or more floating skimmer cassette assembly comprising: a plurality of skimmer blades mounted on one or more chain with rotational motivity to skim contaminants from the surface of the water, one or more pontoon mounted on a support structure of the floating skimmer cassette assembly configured to float the one or more floating skimmer cassette assembly on a surface of the water, a skimmer beach to receive and dewater the skimmed contaminants, and a wave suppression edge formed into a leading edge of a skimmer beach to suppress incoming waves of the water for creation of a quiescent treatment zone for air flotation to occur.

In some embodiments, the contaminants comprise microplastics having a size of less than about 25.0 mm, other contaminants having a size greater than about 25.0 mm, and the liquid comprises a water-based liquid.

In some embodiments, the contaminants comprise microplastics having a size of less than about 2.0 mm, and the liquid comprises a water-based liquid.

Other objects, features, and advantages of the techniques disclosed in this specification will become more apparent from the following detailed description of embodiments in conjunction with the accompanying drawings.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

A more complete understanding of the method and apparatus disclosed herein may be obtained by reference to the following detailed description in conjunction with the accompanying figures, wherein:

FIGS. 13A and 13B illustrate example relationships between the flow rate and the treatment (flotation) zone's length and depth given a bubble rise rate of 0.25 m/sec;

FIGS. 14A and 14B illustrate example relationships between the flow rate and the treatment (flotation) zone's length and depth given a bubble rise rate of 0.4 m/sec;

DETAILED DESCRIPTION OF THE INVENTION

Figure 1A:
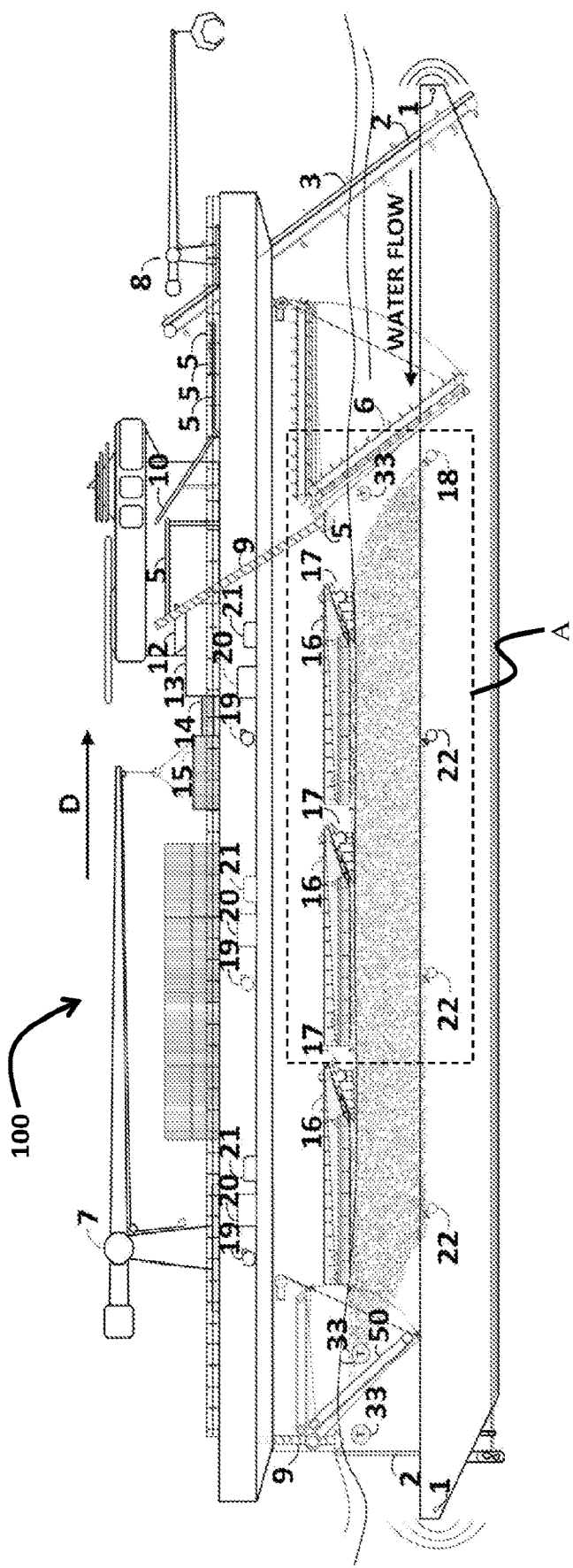
FIG. 1A illustrates a starboard profile view schematic of the marine vessel equipped with self-cleaning trash screens 3 and integral in-hull dissolved air flotation process with flotation skimmer cassette 16 and the flow through band screen 50 process.

Systems and methods for removal of contaminants from a liquid flow will now be described in detail with reference to the accompanying drawings. It will be appreciated that, while the following description focuses on a treatment system that removes contaminants such as microplastics from water, the systems and methods disclosed herein have wide applicability. For example, the treatment systems described herein may be readily employed with other contaminants such as oils and grease or with other liquids. Notwithstanding the specific example embodiments set forth below, all such variations and modifications that would be envisioned by one of ordinary skill in the art are intended to fall within the scope of this disclosure.

Example embodiments of treatment systems to remove contaminants from a liquid generally comprise a means to physically define a liquid treatment zone, means to diffuse bubbles into the liquid treatment zone and means to remove contaminants affected by the bubbles and raised near the surface of the treatment zone. In operational embodiments, when the treatment system is used with a liquid flow, the volume of contaminants in the liquid flow is a lower volume at the exit of the treatment zone than at the entrance of the treatment zone.

The means to define the liquid treatment zone may be any type of physical or relational benchmark to define an area of liquid treatment. In some embodiments, the means to define the liquid treatment zone is by the placement of treatment components in the liquid body. For example, the treatment zone may be defined by placement of bubble diffusers in the liquid body and the area of liquid affected by the bubble diffusers defines the treatment zone. In some embodiments, the treatment zone is defined by a channel of a liquid flow and a depth of the bubble diffusers. In some embodiments, the channel is defined by one or more channel guides defining a channel width and configured to channel the liquid flow from an entrance of the treatment zone to an exit of the treatment zone.

The means to diffuse bubbles may comprise any method of releasing bubbles into a liquid. In some embodiments, the means to diffuse bubbles into the liquid treatment zone are bubble diffuser systems, or bubble diffusers, common in water and wastewater treatment facilities. In some embodiments, the bubble diffusers are nanobubble diffusers configured to diffuse nanobubbles having a negative charge into the liquid flow whereby the nanobubbles are attracted to and adhere to positively charged contaminants and the nanobubbles and the contaminants are urged towards the surface of the liquid flow in the treatment zone. For use in the disclosed treatment systems, some modifications may be required to accommodate the platform the bubble diffusers are mounted to. For example, the bubble diffusers may need to be configured to operate in saltwater and they may need to be configured to be submerged into the liquid flow from a floating vessel.

The means to remove the contaminants affected by the bubbles and raised near the surface of the treatment zone may be any means or skimming, attracting or otherwise removing contaminants from and near the surface of the liquid. In some embodiments, skimmer systems such as flotation skimmer cassette assemblies are positioned near the surface of the liquid to physically capture and remove the contaminants from near the surface of the liquid.

FIG. 1A illustrates an example embodiment of a treatment system 100 comprising a floating vessel. As shown, this vessel generally travels in a direction D creating a liquid flow under the vessel. Hulls 24 define sides of the treatment zone and bubble diffuser manifolds 18 and 22 are placed at a depth that define a bottom of the treatment zone. The skimmers cassettes 16 are configured to capture and remove contaminants from near the surface of the liquid.

Figure 1B:
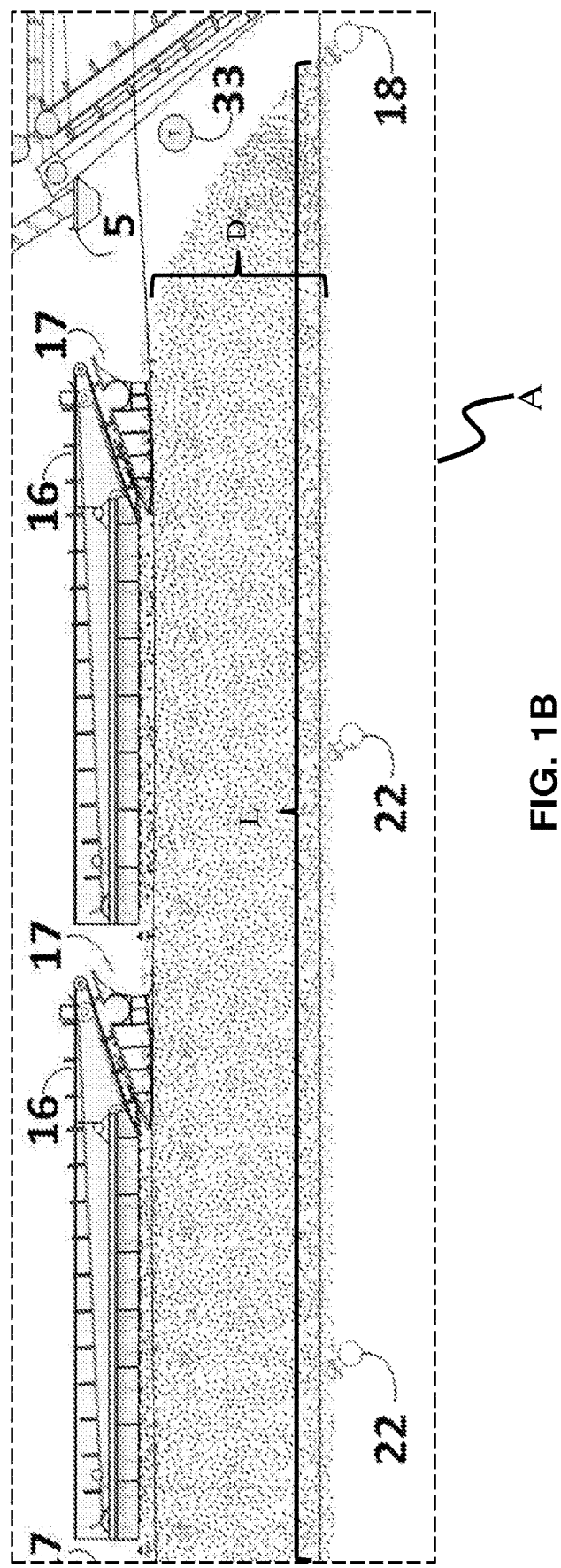
FIG. 1B illustrates a cut-away portion of the embodiments of FIG. 1A.

FIG. 1B shows the cut-away portion A of the example embodiment of FIG. 1A in more detail. FIG. 1B illustrates example embodiments of the treatment zone, the bubble diffusers and the skimmers.

The treatment zone is generally defined by a depth, a width and a length of a channel for liquid. Shown is depth D which represents the depth of the liquid from its surface to the orifice of the bubble diffuser systems, here nanobubble diffuser manifold 18. The length of the channel generally comprises the length between the inflow of liquid into the treatment zone, here the nanobubble diffuser manifold 18 through to the last contaminant removal such as the end of the last skimmer (not shown). The width of the treatment zone is generally the channel width defined by the width of the flow channel such as between hulls of the vessel or other flow dividers.

The bubble diffuser systems may be nanobubble diffusers or other size bubble diffusers. Nanobubbles are either diffused or dispersed into the channeled liquid by a plurality of nanobubble diffuser systems or distributed by a nanobubble infused water stream into the air flotation process via one or more horizontally mounted nanobubble distribution manifolds 18. The nanobubble distribution manifolds may be equipped with a set of duck billed diffuser check valves constructed of elastomers such as Buna-nitrile, EPDM, Viton™, pure gum rubber, etc., to prevent water from backflowing into the nanobubble distribution manifolds 18. The nanobubbles are diffused into a flowing water stream through a plurality of microscopic through-holes of a porous nanobubble diffuser manifold 18 into the screened and channeled water stream. Other methods such as cavitation such as an air aspirated pump, or an air aspirated hi-shear mixer can also be used as long as the nanobubble generation process is economically feasible and the nanobubbles are evenly distributed in the channeled water stream. Microbubbles and larger air bubbles are dispersed or diffused into the successional downstream stages of the dissolved air flotation process by microbubble, fine bubble and/or coarse bubble diffusers 22. These larger bubble diffusers 22 produce a buoyant floating blanket of bubbles to increase the rise rate of the contaminant and nanobubble agglomeration to the surface of water in the channel or a plurality of channels.

One or more flotation skimmer cassettes assembly 16 may be mounted in channels between the pontoons 24 and/or hulls and designed to float near the surface of the liquid flow. The floating skimmer cassette assembly, or flotation skimmer cassette assembly 16 comprises one or more skimmer blade operationally coupled to one or more skimmer cassette pontoon whereby the skimmer blade is positioned near a surface of the liquid flow and generally extending across the channel width. The skimmer blade is operationally coupled to a skimmer drive whereby the skimmer drive is configured to move the skimmer blade in a relative movement to the liquid flow opposite to the direction to the liquid flow. The skimmer blade is also configured to extend from the surface of the liquid flow to a skimming depth whereby the skimmer blade engages the contaminants from the liquid flow at the skimming depth and with the skimmer drive moves the contaminants in the liquid flow in the opposite direction to the liquid flow. In one embodiment, the flotation skimmer cassette assembly float on a set of dissolved air flotation skimmer pontoons constructed of ABS/Polyurethane, aluminum, stainless steel or any other corrosion resistant materials. The skimmer drive may be a chain drive and the skimmer blades may be horizontally mounted on the chain drive with each skimmer blade attached perpendicular to the horizontal forward skimming motion of the chain drive counter current to the motion of the vessel. The skimmer chain drive may be operated on a variable frequency drive to optimize the speed of the skimmer process.

The flotation skimmer cassette assemblies are configured to skim and carry the floated marine plastics, microplastics and debris up inclined beaches of a skimmer beach-augur assembly 17 for dewatering of excess water as the solids are discharged into horizontal augurs within the skimmer beach-augur assembly 17 for further conveyance to either the compactor-extruder units 13 or volute presses for sludge dewatering.

Operationally, referring to FIG. 1B, this portion of methods of using the liquid treatment system, also called a treatment system, include creating a liquid flow to enter the treatment area. This liquid flow may be created by the treatment system's moving in a large liquid body. The liquid flow is channeled in the treatment area where the liquid is exposed to the air flotation process. The dissolved air flotation process will initially be saturated with a high-density of nanobubbles. The negatively charged nanobubbles generated by the nanobubble diffuser manifolds 18 are attracted to the positively charged microplastic particles and adhere the microplastic particles which form a contaminant and nanobubble agglomeration. These agglomerations also agglomerate with other contaminant and nanobubble agglomerations that will coagulate into larger contaminant and nanobubble masses enhancing their collective buoyancy to float the microplastics to the surface of the water as a froth.

The froth is then skimmed and removed by the flotation skimmer cassettes 16. The flotation skimmer cassettes 16 will then skim the flocculated microplastic particles with a plurality of skimmer blades moving in a counter current direction to the channel water flow to skim the froth to the inclined beach of the skimmer beach-augur assemblies 17. The froth is dewatered on the inclined beach and eventually the semi-dewatered solids are discharged into the skimmer beach-augur assemblies 17 for conveyance and dewatering. The skimmers skim and carry the floated marine plastics, microplastics and debris up inclined beaches for dewatering of excess water as the solids are discharged into horizontal augurs within the skimmer beach-augur assembly 17 for further conveyance to either the compactor-extruder units 13 or volute presses for sludge dewatering.

The latter flotation stages may be configured to have the highest concentration of microbubbles and larger air bubbles to provide the floating blanket with a faster rise rate to the water surface for froth skimming and removal by the flotation skimmer cassettes 16. The number of flotation channels, flotation stages and the overall length of the flotation channels will be directly related to the desired design travel speed of the filter vessel. The faster the desired travel speed, the longer the vessel will become to provide the proper rise rates and removal efficiency.

The nanobubble infused water stream approach has been determined to be a low energy consumption process along with a low maintenance requirement.

Referring back to FIG. 1A, the treatment systems and methods may comprise additional components to further enhance treatment of the liquid. FIG. 1A shows a starboard side profile view of a filter vessel equipped with a set of self-cleaning trash screens 3 and a set of self-cleaning fine screens 6 located between the vessel's double hulls or pontoons 24 that is used for the primary filtration process.

The double hulled or multi-hulled vessels used for the filter vessel's filtration process to provide an open channel or multiple channels for mounting of self-cleaning screens that are designed for the effective filtration and removal of the floating debris and microplastics from contaminated water bodies. A set fish deterrent systems, such as acoustic or visual deterrent systems, may be mounted below the water line on the bow and the stern of the vessel's hull(s) or pontoons 24 of the filter vessel to deter a variety of fish and aquatic life from the ocean filtration process. The acoustic fish deterrent systems will generate acoustic sound waves that will emanate from the ship's bow and will operate at multiple acoustic sound wave frequencies. The acoustic fish deterrent systems 1 may cycle through a range of predetermined sound wave frequencies on a timed-cycle basis that can be adjusted by the vessel operator in order to deter fish and aquatic life based on the aquatic life speciation and it's sensitivity to the sound frequencies.

A set of visual fish deterrent systems 2 equipped with high intensity underwater LED lights may be mounted on the bow of the vessel integral to the self-cleaning trash screens 3. The high intensity LED fish deterrent lights may cycle through oscillating patterns of light pulsing on a timed-cycle basis to provide visual deterrence fish and aquatic life.

A plurality of primary self-cleaning coarse or self-cleaning trash screens 3 may be mounted at the forward leading edge of filter vessel's the bow operating in parallel perpendicular to the channel water flow and spanning entire width of the channel or channels formed between the hulls or pontoons 24 or spanning the plurality of channels formed between the hulls, pontoons 24 and/or partitions of multi-hulled vessels. The self-cleaning trash screens 3, are constructed of parallel bars mounted vertically and may be constructed of corrosion resistant materials with the necessary strength to withstand the external forces and potential impact of large objects that may be encountered during primary screening process at various filter vessel speeds.

The self-cleaning trash screens 3 are rated for the removal of floating debris and large objects. The trash screens may be continuously cleaned by a set of upward moving trash rakes 4 tines, skips or fingers that will lift, raise and elevate captured solids to deck mounted horizontal conveyors 5. The elevation speed of the trash rake 4 mechanisms is adjusted by variable speed driven motors. The travel speed of the rakes will either increase or decrease to meet the plastic solids loading rate that will also be related to the travel speed of the vessel.

The horizontal conveyors 5 located on the deck of the filter vessel may convey the screened solids to either the port or starboard side to provide flexibility of process operation and redundancy of the screened solids compaction and dewatering process. The screened solids are then conveyed to a set of inclined conveyors 10 for discharge into the receiving hoppers 12 of waste compactor-extruder units 13 to compress and compact the screened solids through a restrictor plate mechanism 14 for solids compression, compaction and dewatering. The dewatered solids are then extruded and directed into either shipping containers 15, barges, supersacks, etc. for transportation back to shore-based recycling facilities for further processing via a deck crane 7.

Large floating objects, fishing nets, etc. may be removed from the channel area between the bows of the filter vessel with a set of bow cranes 8 that may be equipped with multi-tined grapples and/or robotic arms that may be equipped with shearing or diamond bladed cutting or devices.

A plurality of self-cleaning fine screens 6 may be positioned after either the self-cleaning trash screens 3 depending on the solids loading and the particle size distribution of the floating debris. The self-cleaning fine screens 6 are configured in parallel spanning width of the channel formed between the hulls, pontoons 24 or spanning the plurality of channels formed between the hulls, pontoons and/or partitions 23. The self-cleaning fine screens 6 are fabricated using either vertically mounted parallel bars with an open area or spacing between the bars, perforated metal sheets or fine wedge-wire mesh.

Materials of construction of the self-cleaning fine screens 6 may be corrosion resistant for the water body requiring filtration, as long as the materials provide the necessary strength for the external forces that are encountered during fine screening process at various filter vessel speeds.

The self-cleaning fine screens 6 may also operate at various angles of 0-90 degrees from vertical to provide the proper depth for the vessel speed or to completely remove the self-cleaning fine screens 6 from the water for periodic inspection, service, preventative maintenance or during vessel higher speeds.

The self-cleaning fine screens 6 may also discharge the screened solids into a set of horizontal augurs or horizontal conveyors 5 that will then convey the screened solids to a set of inclined augurs 9. The augur may also have perforations on the lowest elevation sections to provide dewatering. The screened solids are then discharged into the hoppers 12 of waste compactor-baler or extruder units 13. The baled and or extruded solids are then compacted and discharged into shipping containers 15, polypropylene super sacks, barges, etc. for transportation back to an onshore based recycling facility or disposal site. The baled solids, shipping containers 15, polypropylene super sacks, etc. will be transferred to barges, transfer ships or on-shore docks via a deck crane 7 mounted on the filter vessel's deck.

The screened water will then flow from the self-cleaning fine screens 6 through the channel or a plurality of a channels formed with vertical partitions mounted between the hulls and/or pontoons 24. A set of wave suppression devices may be formed into the leading edge of the skimmer beach-augur assemblies 17 to minimize the turbulence and other effects of waves on the dissolved air flotation process.

As discussed above with respect to FIG. 1B, bubble diffuser systems enable the air flotation process in the liquid flow. Nanobubbles may be diffused or dispersed into the channeled water by a plurality of nanobubble diffusers or by a nanobubble infused water stream by a set of horizontally mounted nanobubble distribution manifolds 18. The negatively charged nanobubbles generated by the nanobubble diffuser manifolds 18 are attracted to the positively charged particles and contaminants such as microplastics, and adhere to the particles which form a contaminant and nanobubble agglomeration. The agglomerations also agglomerate with other contaminant nanobubble agglomerations that will coagulate into larger contaminant and nanobubble masses enhancing their collective buoyancy to float the microplastics to the surface of the water as a froth. Microbubbles and larger air bubbles will be dispersed or diffused into the successional downstream stages of the dissolved air flotation process to produce a buoyant floating blanket of bubbles to increase the rise rate of the contaminant and nanobubble agglomeration to the surface of water in the channel or a plurality of channels.

The froth is then skimmed and removed by the flotation skimmer cassette assemblies 16. The latter flotation stages will have the highest concentration of microbubbles and larger air bubbles to provide the floating blanket with a faster rise rate to the water surface for froth skimming and removal by the flotation skimmer cassette assemblies 16. The number of flotation channels, flotation stages and the overall length of the flotation channels will be directly related to the desired design travel speed of the filter vessel. The faster the desired travel speed, the longer the vessel will become to provide the proper rise rates and removal efficiency.

The skimmers skim and carry the floated marine plastics, microplastics and debris up inclined beaches for dewatering of excess water as the solids are deposited into augur channels to be discharged with horizontal augurs within the skimmer beach-augur assembly 17 for further conveyance to either the compactor-baler or extruder units 13 or volute presses for sludge dewatering.

A plurality of flow-through band screens 50 may be positioned downstream of the flotation skimmer cassette assemblies 16 and mounted within the flotation channels formed between the hulls, pontoons 24 and partitions 23. The band screens 50 are sized to remove any microplastics that were not floated and removed by the upstream the nanobubble flotation process and skimmed by the flotation skimmer cassettes 16. The flow through band screens 50 will discharge the screened solids into a horizontal augur 31 for further conveyance to either the compactor-extruder units 13 or to volute presses for sludge dewatering. The flow through band filters 50 that are adjustable to operate at angles that will increase the microplastic capture and removal efficiency. The flow through band screens 50 are equipped with a lift mechanism fully retractable from the channel water for periodic maintenance, servicing, and during higher travel speeds to and from the area targeted for filtration.

Large floating objects, fishing nets, etc. are removed from the channel area between the bows of the filter vessel with a set of bow cranes 8 equipped with either multi-tined grapples or robotic arms equipped with diamond bladed cutting devices.

The filter vessel's contaminant filtration process is monitored throughout the stages of the filtration process with a plurality of turbidity sensors 33 that are positioned on the hulls and channel walls with a set located after the trash screens, a second set located after the fine screens, a third set located after the nanobubble flotation process and a final set after the flow through band screens. The turbidity meters 33 would send a conditioned signal to a PLC and PC computer system to monitor and record the removal efficiency and performance of the filter vessel process.

Figure 2:
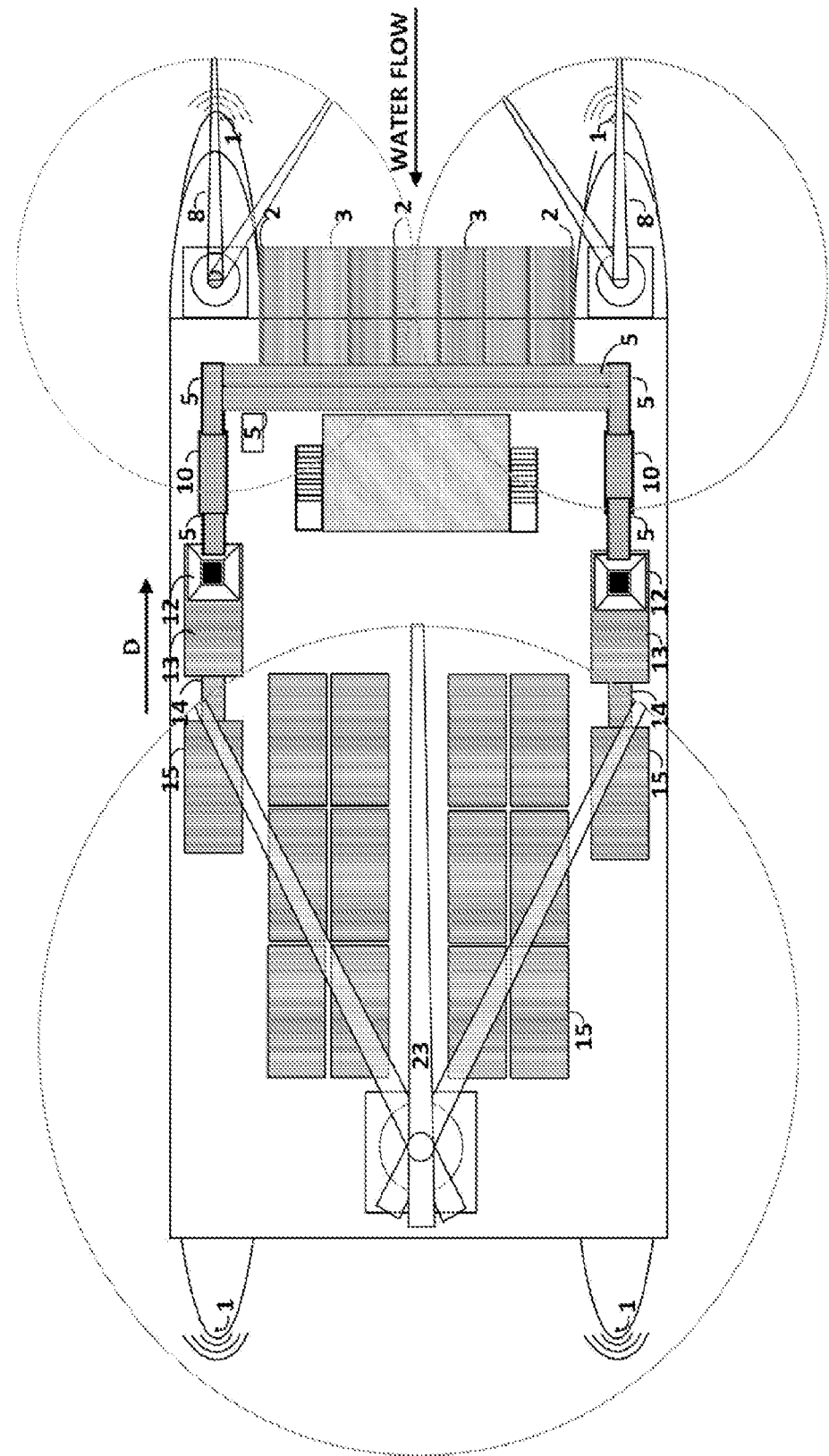
FIG. 2 illustrates a plan view schematic of the filtration vessel's main deck and the self-cleaning trash screens 3 located between pontoons 24 and/or partitions 23 used for primary filtration process along with the conveyors 5, 10, waste compactor/balers or extruders 13, shipping containers 15, deck crane 7, etc.

FIG. 2 shows a plan view—main deck of a filter vessel with two hulls or pontoons 24 that vessels provide an open channel for the effective filtration, removal and processing of the floating debris and microplastics from water.

The filter vessel is equipped with a self-cleaning trash screens 3 located between the filter vessel's double hulls or pontoons 24 that is used for the primary screening of floating debris, plastics and large objects. The self-cleaning trash screens 3 mounted in lifting cassettes spanning width of the channel formed between the hulls or pontoons 24 and/or spanning between the partitions 23 that form channels between the hulls of multi-hull vessels.

The self-cleaning trash screens 3 discharge the screened solids into a set of horizontal conveyors 5 that will convey the solids to a set of inclined augurs 10 for discharge into the hoppers 12 of waste compactor-baler or extruder units 13. The compressed solids are dewatered as they are compacted in a chamber by a set hydraulic rams and baled or forced through a set of discharge restrictor plates 14 and subsequently discharged into either shipping containers 15, polypropylene super sacks and loaded onto barges, etc. for transportation back to an onshore based recycling facilities or disposal sites. The compressed bales, shipping containers 15, polypropylene super sacks, etc. are transferred from the filter vessel to either barges or transfer ships via a deck crane 7.

Large floating objects, fishing nets, etc. are removed from the channel area between the bows of the filter vessel with a set of bow cranes 8 equipped with either multi-tined grapples or robotic arms equipped with diamond bladed cutting devices.

Figure 3:
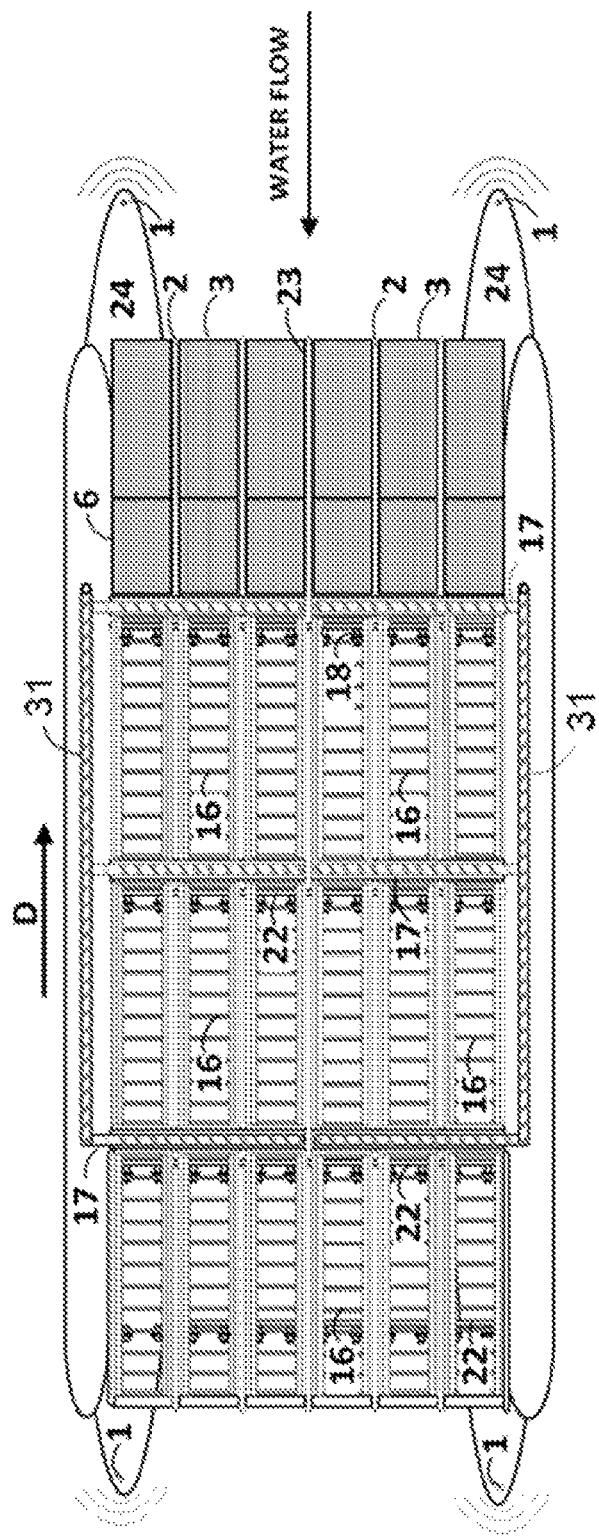
FIG. 3 illustrates a cross sectional plan view below the deck of the filter vessel showing the channels equipped with self-cleaning screens and the flotation skimmers 16, nanobubble distribution manifolds 18, larger bubble distribution manifolds 22, and flow through band screens 50, etc.

FIG. 3 shows a cross sectional plan view of operational area below the deck of the filter vessel showing the channels equipped with a self-cleaning trash screens 3 mounted in screen lifting cassettes and located between the filter vessel's double hulls or pontoons 24 that is used for the primary filtration process. A set of self-cleaning fine screens 6 are mounted in screen lifting cassettes spanning width of the channels formed between the hulls, pontoons 24 and/or partitions 23.

Flotation skimmer cassette assemblies 16 may be mounted in flotation channels formed between the hulls, pontoons 24 and/or partitions 23. The flotation skimmer cassette assemblies 16 may be designed to float on a set of skimmer pontoons constructed of ABS/Polyurethane, aluminum, stainless steel or any other corrosion resistant materials. The flotation skimmer cassettes 16 are equipped with a set of skimmer blades constructed of any material suitable for their purpose. In some embodiments, the skimmer blades are constructed of either stainless steel and/or polypropylene. The skimmer blades are horizontally mounted on a skimmer drive with each skimmer blade attached generally perpendicular to the horizontal forward skimming motion of the chain. The skimmer drive may be powered by a variable frequency skimmer drive motor to optimize the speed of the skimmer blades. The skimmers will then skim the floated contaminants (e.g., microplastics, oil, grease and debris) counter current to the flow and up inclined beaches for dewatering of excess water as the solids are discharged into skimmer beach-augur assemblies 17. The solids are then conveyed and discharged into a set of horizontal augurs 31 for further transfer and conveyance to a plurality of sludge dewatering presses for sludge dewatering or oil separation/recovery systems.

A plurality of horizontally mounted nanobubble distribution manifolds 18 will distribute the nanobubble infused water solution to the treatment zone channel (dissolved air flotation chambers) for flotation of the buoyant contaminants. The nanobubble distribution manifolds 18 may be mounted horizontally and span the width of the double hulls and/or pontoons 24. The nanobubble distribution manifolds 18 may be equipped with a set of duck billed-type check valves constructed of compatible elastomers such as Buna-nitrile, EPDM, Viton, pure gum rubber, etc., to prevent water from backflowing into the nanobubble distribution manifolds 18.

A plurality of flow through band screens, belt screens or drum screens 50 may be mounted downstream of the flotation skimmer cassette assemblies 16 within the flotation channels to sized and designed filter and capture and remove any floated microplastics not floated and captured in the nanobubble flotation process.

A plurality of larger bubble diffuser systems, such as horizontally mounted microbubble, fine bubble and/or coarse bubble diffusers 22 or distribution manifolds will distribute a bubble infused water solution or diffuse air into the treatment zone channels (dissolved air flotation chambers) downstream of the nanobubble distribution manifolds 18 for the formation of a blanket of coarse bubbles to provide an increased rise rate and flotation of the buoyant contaminants adhered to the nanobubbles. The coarse bubble distribution diffuser or manifolds 22 may span the width of the double hulls and/or pontoons 24 and are also equipped with a set of duck billed diffuser-type check valves to prevent water from backflowing.

A plurality of flow through band or belt filters 50 may be mounted downstream of the flotation skimmer cassette assemblies 16 within the flotation channels sized and designed to filter and capture and remove floated microplastics not floated and captured in the nanobubble flotation process.

Figure 4:
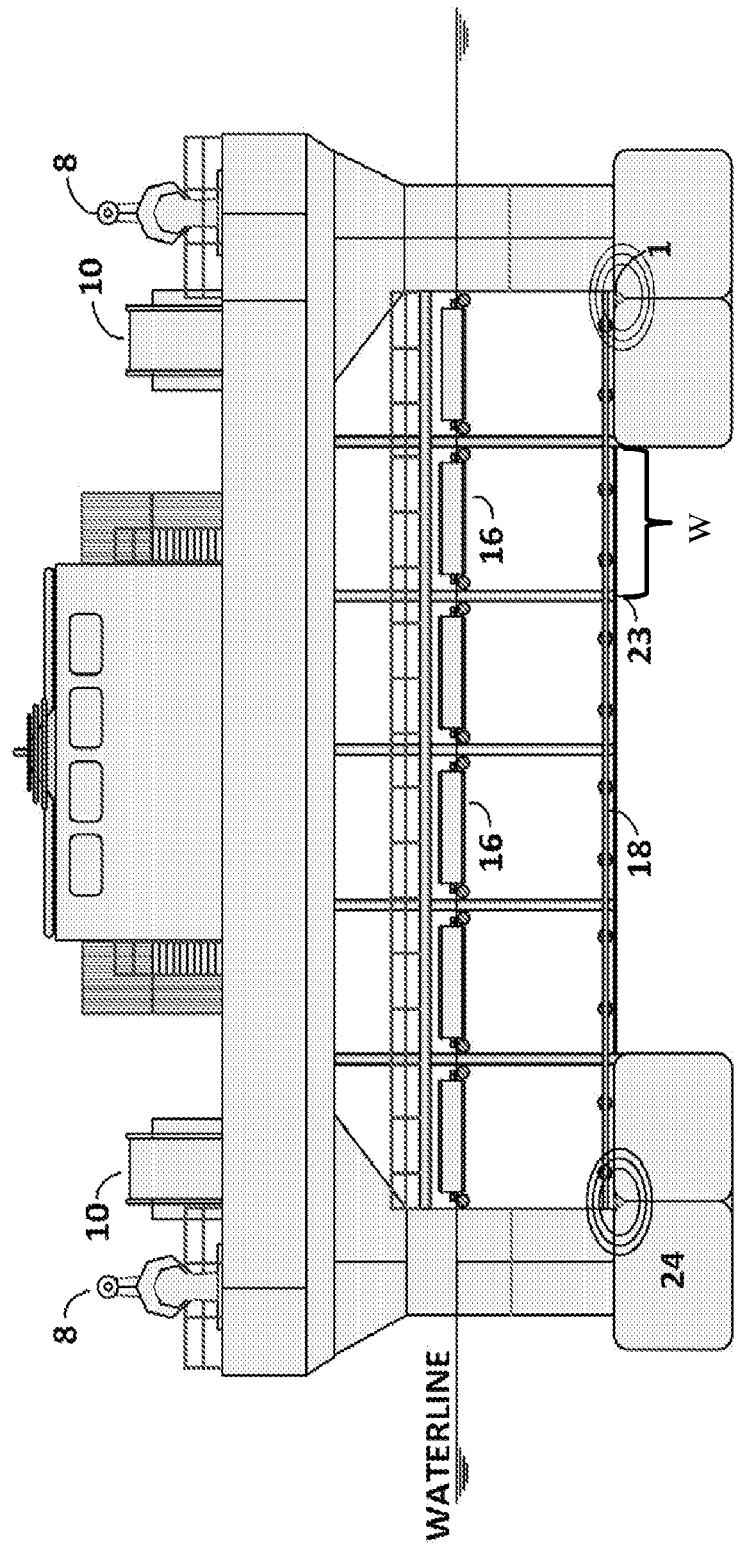
FIG. 4 illustrates the filter vessel's bow profile schematic view of a horizontal cross section after the self-cleaning fine screens that shows the flotation skimmer cassettes 16, also shows the flow through band filters 50, the nanobubble distribution manifolds 18 and the larger bubble distribution manifolds 22 mounted within the formed channels between the vessel's hulls, pontoons 24 and/or the partitions 23.

FIG. 4 illustrates an example of the filter vessel's bow profile view in a horizontal cross section after the self-cleaning screens showing the flotation skimmer cassette assemblies 16 located between the hulls, pontoons 24 and/or the partitions 23 that form the channels for the filter vessel's microplastic flotation process. The nanobubble diffuser manifold 18 is shown below the dissolved air flotation skimmer cassette assemblies to distribute the nanobubble infused water solution to float the microplastic particles. Negatively charged nanobubbles are attracted to the positively charged microplastic particles for enhanced buoyancy and flotation. Microplastic and nanobubble agglomerations are attracted to other microplastic contaminants to coagulate or agglomerate into larger agglomerated particles and masses. Increased concentrations of larger bubble (e.g., microbubbles, fine bubbles and coarse bubbles) will be infused into the liquid flow downstream by successional coarse bubble distribution manifolds 22 or diffusers to accelerate the rise rate of the nanobubble flotation process. The concentration of larger bubbles in the latter stages may also be adjusted to higher levels to increase the buoyancy of the nanobubble and contaminant agglomerations based on the speed of the vessel and the suspended solids loading on the microplastic flotation process.

FIG. 4 also shows the width of the treatment zone W in this embodiment. The width W is generally the dimension between the channel dividers.

Figure 5A:
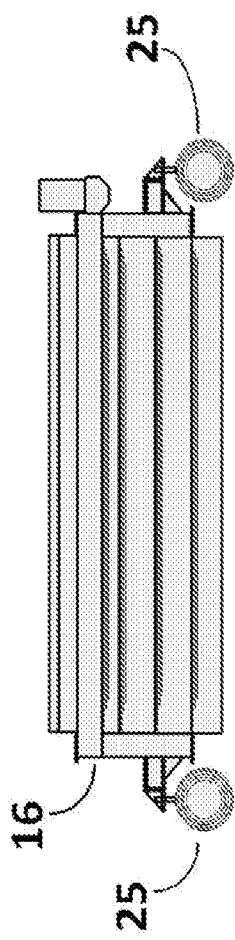
FIG. 5A illustrates a front view of a flotation skimmer cassette 16 assembly equipped with flotation pontoons 25 and skimmer blades 26.
Figure 5B:
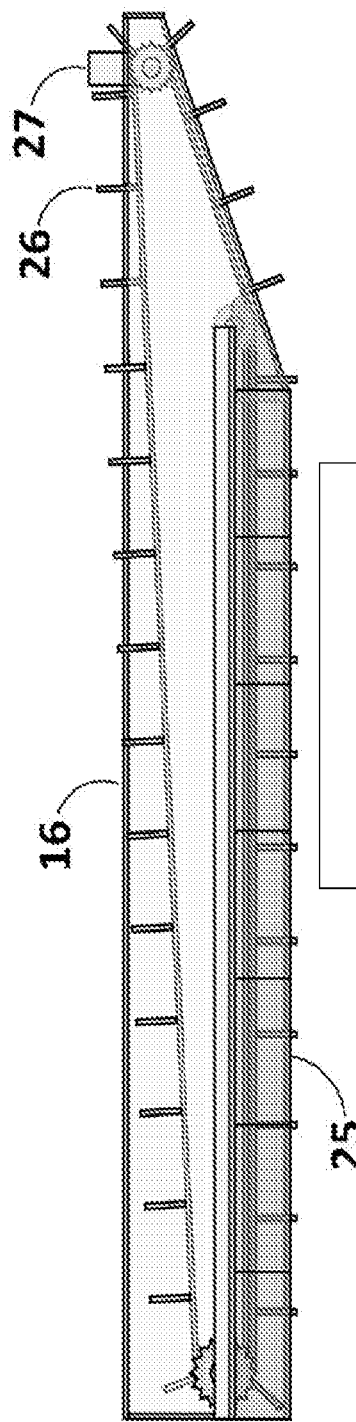
FIG. 5B illustrates a side view of a flotation skimmer assembly 16 assembly equipped with flotation pontoons 25 and skimmer blades 26.

FIGS. 5A and 5B illustrate a schematic of an example embodiment of the flotation skimmer cassette assembly 16 and its components including the skimmer blades 26 and a skimmer drive 27. FIG. 5A shows a front view of the flotation skimmer cassette assembly 16. FIG. 5B shows a side view of an example flotation skimmer cassette assembly 16. The skimmer blade 26 may be operationally coupled to one or more skimmer cassette pontoon 25 whereby the skimmer blade 26 is positioned near a surface of the liquid flow to skim contaminants and/or dissolved air flotation float from the surface of the water. The skimmer blade 26 may be operationally coupled to the skimmer drive whereby the skimmer drive 27 is configured to move the skimmer blade 26 in a relative movement to the liquid flow. Normally, the relative movement of the skimmer blade 26 is in an opposite direction to the liquid flow. The skimmer blade 26 is configured to generally extend across the channel width and extend from the surface of the liquid flow to a skimming depth whereby the skimmer blade 26 engages the contaminants from the liquid flow at the skimming depth and moves the floated contaminants in the liquid flow in the opposite direction to the liquid flow and out of the liquid flow. The skimmer blade 26 may also extend a small distance above the surface of the liquid flow to also skim froth than may rise above the surface of the liquid. The skimmer drive 27 may include a variable speed motor that will allow for the adjustment of the skimmer speed based on the solids loading and the vessel speed. In some embodiments, a set of skimmer cassette pontoons 25 will float the flotation skimmer cassette 16 in the channel. The skimmer cassette pontoons 25 may also have the capability of fine tuning the height adjustment to meet the operating flotation skimmer cassette's 16 buoyancy requirements to an optimal skimmer blade depth and positioning on the flotation beach-augur assembly for assurance of effective skimming of the nanobubble infused microplastic froth and effective discharge into the augur. The skimmer cassette pontoons 25 may be constructed of any suitable material to enhance the buoyancy of the flotation skimmer cassette assemblies. For example, and not for limitation, the skimmer cassette pontoons 25 may be constructed from stainless steel, and/or polypropylene, fiberglass, nylon, etc.

Figure 6:
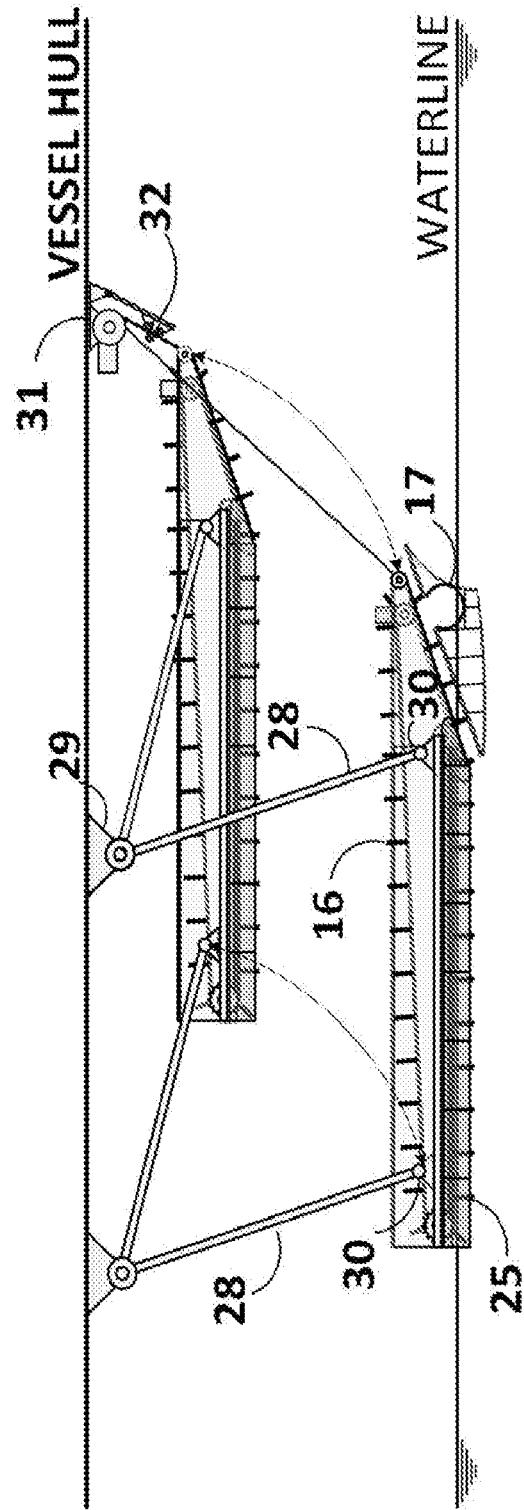
FIG. 6 illustrates a flotation skimmer cassette assembly 16 lift mechanism.

FIG. 6 illustrates a schematic of an example embodiment of a flotation skimmer cassette assembly lift mechanism that may be used to provide adjustments to the flotation skimmer cassette 16 relative to its position on the beach-augur assembly. The flotation skimmer cassette assembly lift mechanism will also elevate the flotation skimmer cassette 16 above the surface of the water to allow operator inspection and service for flotation skimmer cassette assembly maintenance and to allow the vessel to operate at elevated speeds during periods where the filter vessel is sailing to either the designated target areas for ocean filtration or when traveling back to shore. The flotation skimmer cassette assembly 16 lift mechanism is elevated by means of a motorized winch that uses a cable attached to the flotation skimmer cassette assembly 16. A set of four pivot swing arms 28 maintain a controlled arc movement of the flotation skimmer cassette while also maintaining a horizontal plane of the flotation skimmer cassette assembly 16 as well. The upper portion of the pivot swing arms 28 are connected to stationary pillow block bearings 29 mounted on the bottom of the vessel's hull while the lower portion of the swing poles are attached to a second set of pillow block bearings 30 mounted on four sides of the flotation skimmer cassette assembly 16. An electric motor-powered winch 31 is attached to the flotation skimmer cassettes by a cable assembly. As the flotation skimmer cassette assembly 16 is lowered into place, it will come to rest on the surface of the water and the skimmer beach-augur assembly 17 to reduce the loading on the winch and pivot swing arms. A pressure transducer will sense the buoyancy of the flotation skimmer cassette and provide the required tension in the winch cable to assure that the flotation skimmer cassette 16 maintains is proper longitudinal positioning on the skimmer beach-augur assembly 17. The electric motor-powered winch 31 will stop lowering the flotation skimmer cassette 16 when the cable tensiometer sensor 32 senses a reduction in winch cable tension. The cable tensiometer sensor 32 is held into a set location on the winch cable by means of an articulated tether to assure that the cable tensiometer sensor 32 maintains its position on the cable while at the same time has the flexibility of movement with the motion of the cable. The cable tensiometer sensor 32 also continuously monitors winch cable tension of the flotation skimmer cassette 16. Each flotation skimmer cassette will also monitor to its proper positioning on the skimmer beach-augur assembly 17 by means of an optical positioning sensor to assure that the flotation skimmer discharges the skimmed microplastic froth into the flotation sludge augur. The optical positioning sensor will also send a signal to the ballast control system to assure that the flotation skimmer cassettes 16 positioning on the skimmer beach-augur assembly 17 is maintained by proper vessel ballasting.

In an example embodiment of the invention, the flotation skimmer cassettes 16 can also be raised and lowered with a hydraulic lifting mechanism as an alternative to the winch and cable mechanism.

Figure 7:
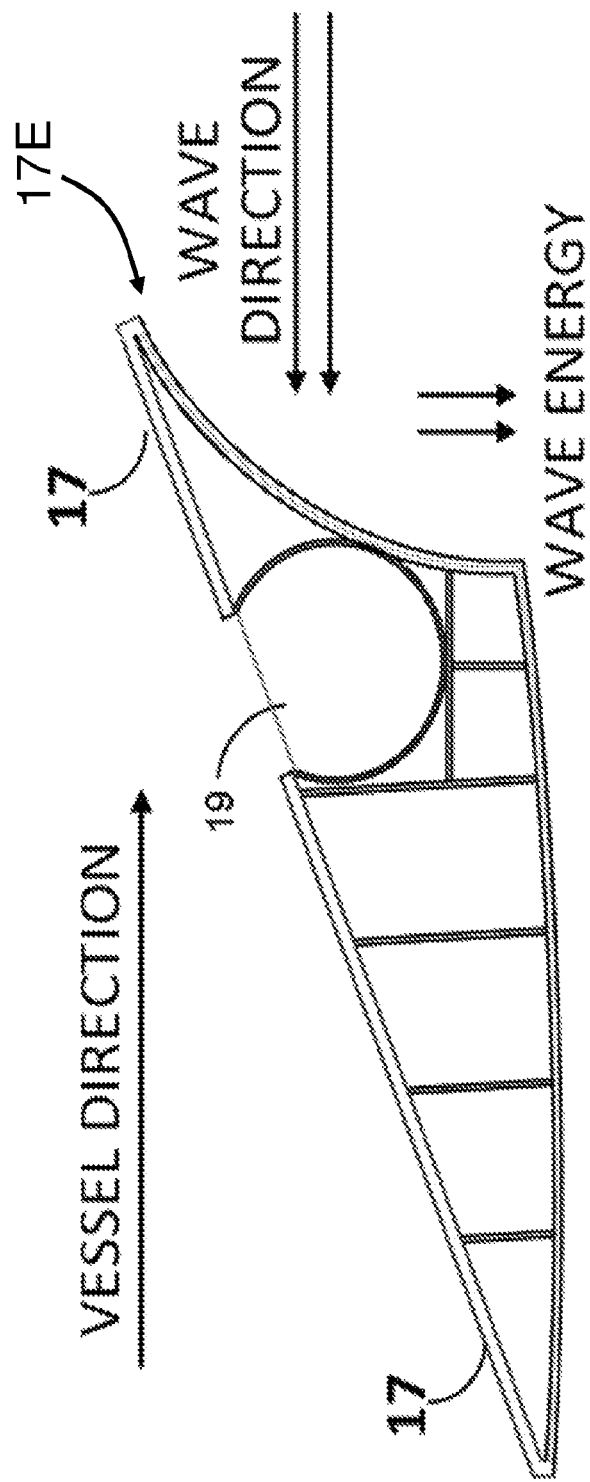
FIG. 7 illustrates a schematic of a skimmer beach-augur housing 17.

FIG. 7 illustrates a side-view schematic of the skimmer beach-augur assembly 17 that is designed to span the width of the channel and provide a large inclined surface area for initial contaminant froth dewatering. The skimmer blades of the flotation skimmer cassette 16 will travel up the surface of the inclined beach and out of the liquid flow as the skimmer blade moves over the inclined beach surface to shed excess water from the microplastic froth. The angle of inclination of the beach may be any angle suitable for its purpose. In some embodiments, the angle of inclination of the beach is in the range of greater than about 10 degrees from horizontal and less than 90 degrees. In some embodiments, the angle of inclination is in the range of 15-30 degrees from horizontal. The skimmer beach-augur assembly 17 may be constructed of stainless steel, polypropylene, fiberglass or any other material that is corrosion resistant and has the structural integrity to house the flotation sludge augur (not shown) in the augur channel 19 and to provide wave suppression as well. The augur may be positioned in the augur channel 19 whereby contaminant froth falls into the channel by gravity when moving up the inclined beach and the augur turns along the channel moving the contaminant froth along and out of the augur channel 19. Wave suppression of the skimmer beach-augur assembly 17 is achieved by the wave suppression edge, or leading edge 17E and an internally curved radius that is configured to drive the force and energy of the oncoming waves downward into the body of water within the channel. The leading edge 17E of the wave suppression structure is located at the top of the skimmer beach-augur assembly 17 where an internally curved radius forces the wave energy on a downward direction to suppress the waves. The internally curved radius may be any suitable curve to provide wave suppression. In one example embodiment, the internally curved radius is about 45-90 degrees from horizontal.

Figure 8:
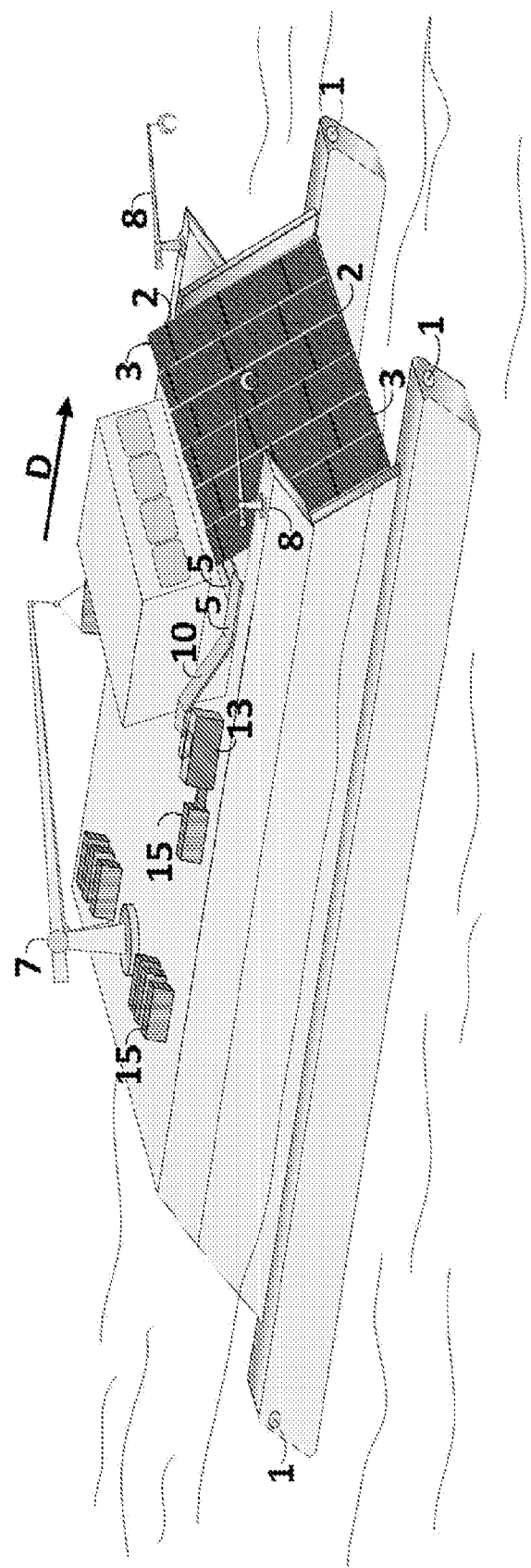
FIG. 8 illustrates a three-dimensional drawing of the filtration vessel showing the self-cleaning trash screens 3, deck crane 7, bow cranes 8 and aquatic life deterrent systems 1, 2, etc.

FIG. 8 illustrates a three-dimensional drawing of the filter vessel moving in a direction D showing the acoustic aquatic life and fish deterrent systems 1, the visual aquatic life and fish deterrent systems 2, the self-cleaning trash screens 3, the horizontal conveyors 5 and inclined conveyors 10, and the compactor-extruder 13, and the containers that will collected the compacted and dewatered solid waste. It also shows the bow cranes 8 and the main deck crane 7 for the movement and transfer of the on-board containers to barges or transfer ships.

Figure 9:
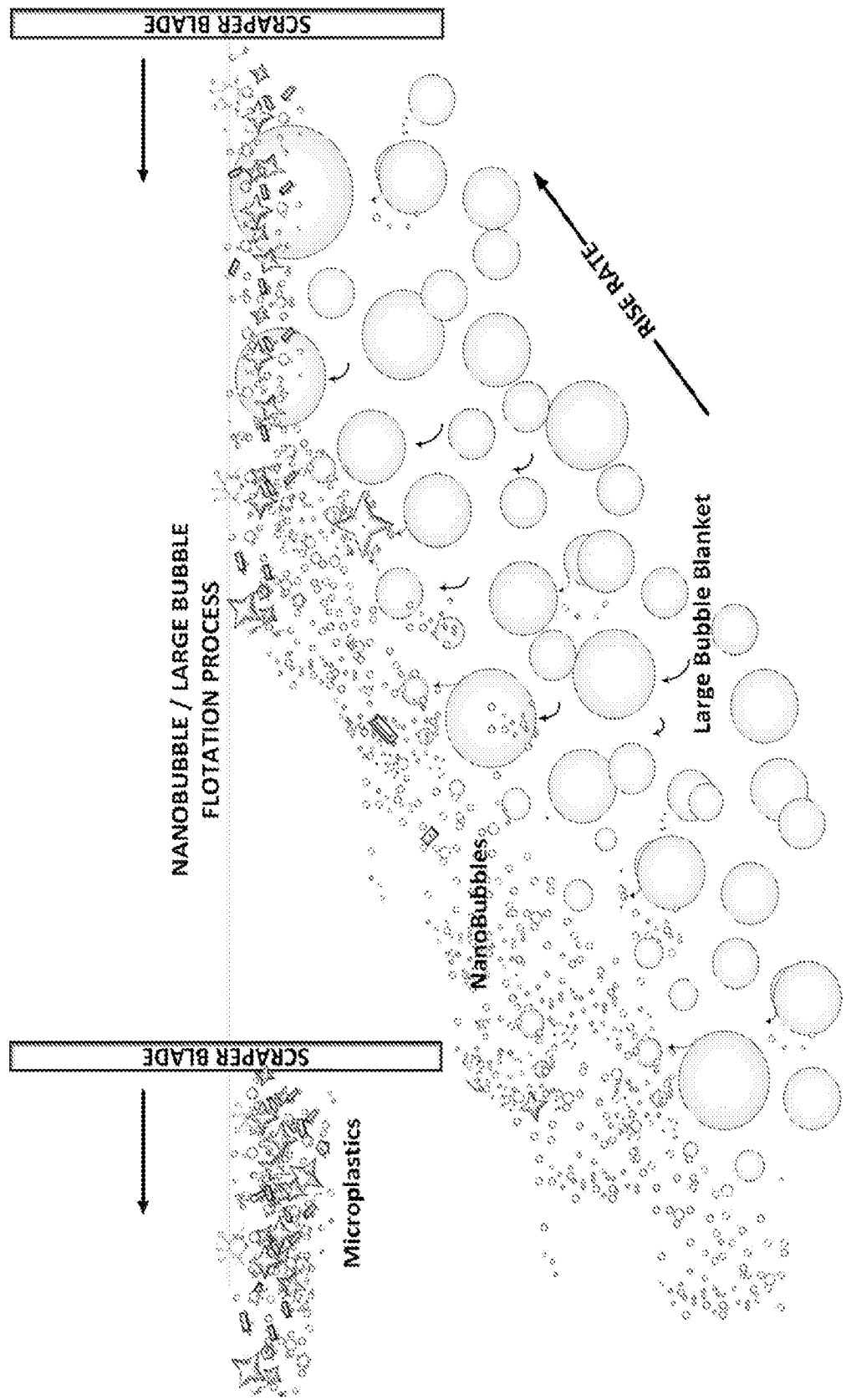
FIG. 9 illustrates the interaction of nanobubbles, larger bubbles and contaminants in an example embodiment of the dissolved air flotation process.

FIG. 9 illustrates the interaction of nanobubbles, larger bubbles and contaminants in an example embodiment of the dissolved air flotation process. Negatively charged nanobubbles are attracted to positively charged contaminants that will agglomerate with other contaminants into larger agglomerated masses resulting in enhanced particle size and buoyancy. Larger bubbles diffused downstream of the diffused nanobubbles will form a large bubble blanket of bubbles having a faster rise rate that will collectively enhance and accelerate the flotation of the nanobubble and contaminant agglomerated masses. The flotation of the agglomerated masses is enhanced by the rise of the larger bubbles which collide with and impart upward forces on the agglomerated masses causing them to rise to the surface. As shown in, the skimmer (scraper) blades skim the agglomerated masses as froth from the surface of the liquid.

Figure 10:
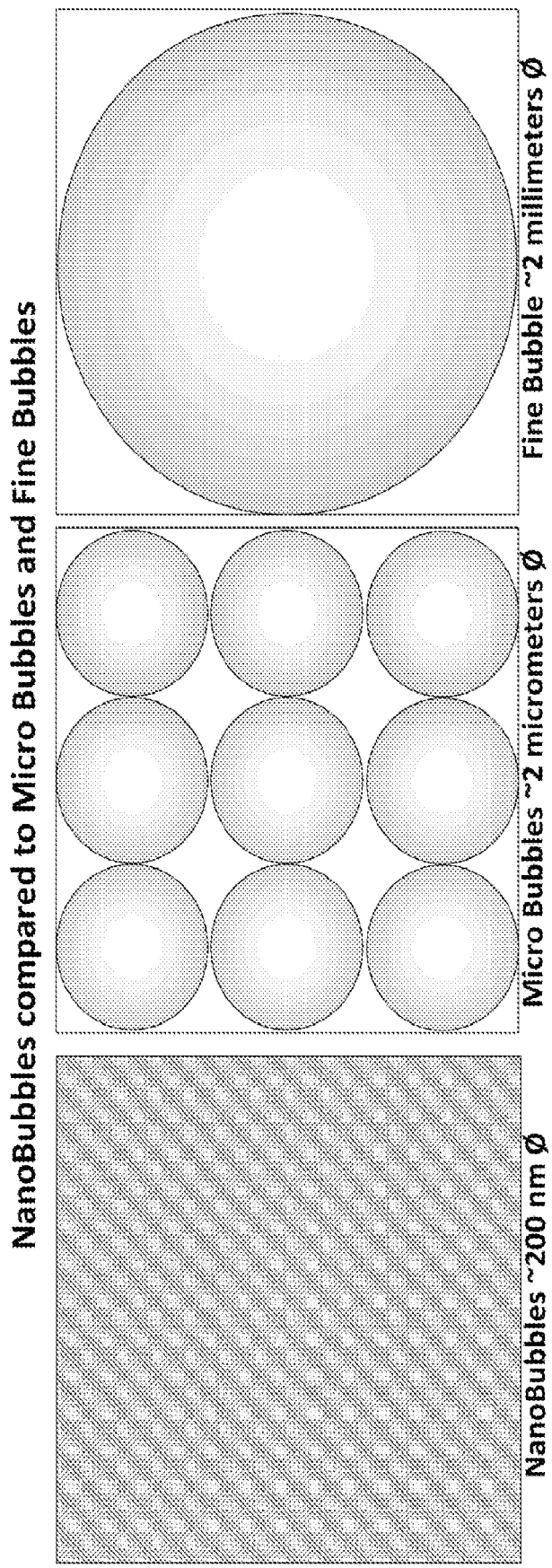
FIG. 10 provides an example comparison of the size of nanobubbles compared to microbubbles and fine bubbles.

FIG. 10 illustrates how the size of nanobubbles compare to the microbubbles and fine bubbles. The typical range of nanobubbles are in the 40-200 nanometer (nm) range. The figure shows that 10,000 nanobubbles will reside in a given area as compared to nine or ten microbubbles and one fine bubble. Nanobubbles cannot be physically seen by the naked eye and require the scattering of a green laser light to see the presence of nanobubbles in water. Nanobubbles are diffused as micro-nanobubbles in the 50-micron range and will shrink in size based on the pressure of the gas delivered to the diffuser and ions that exist at the interface of the liquid and the gas. This phenomenon will increase the ion concentration at the interface on the surface of the bubble and raises the inner bubble pressure and the as well as the temperature of the bubbles. Radicals such as OH— will then form on the surface of the bubble creating a negative surface charge.

Figure 11:
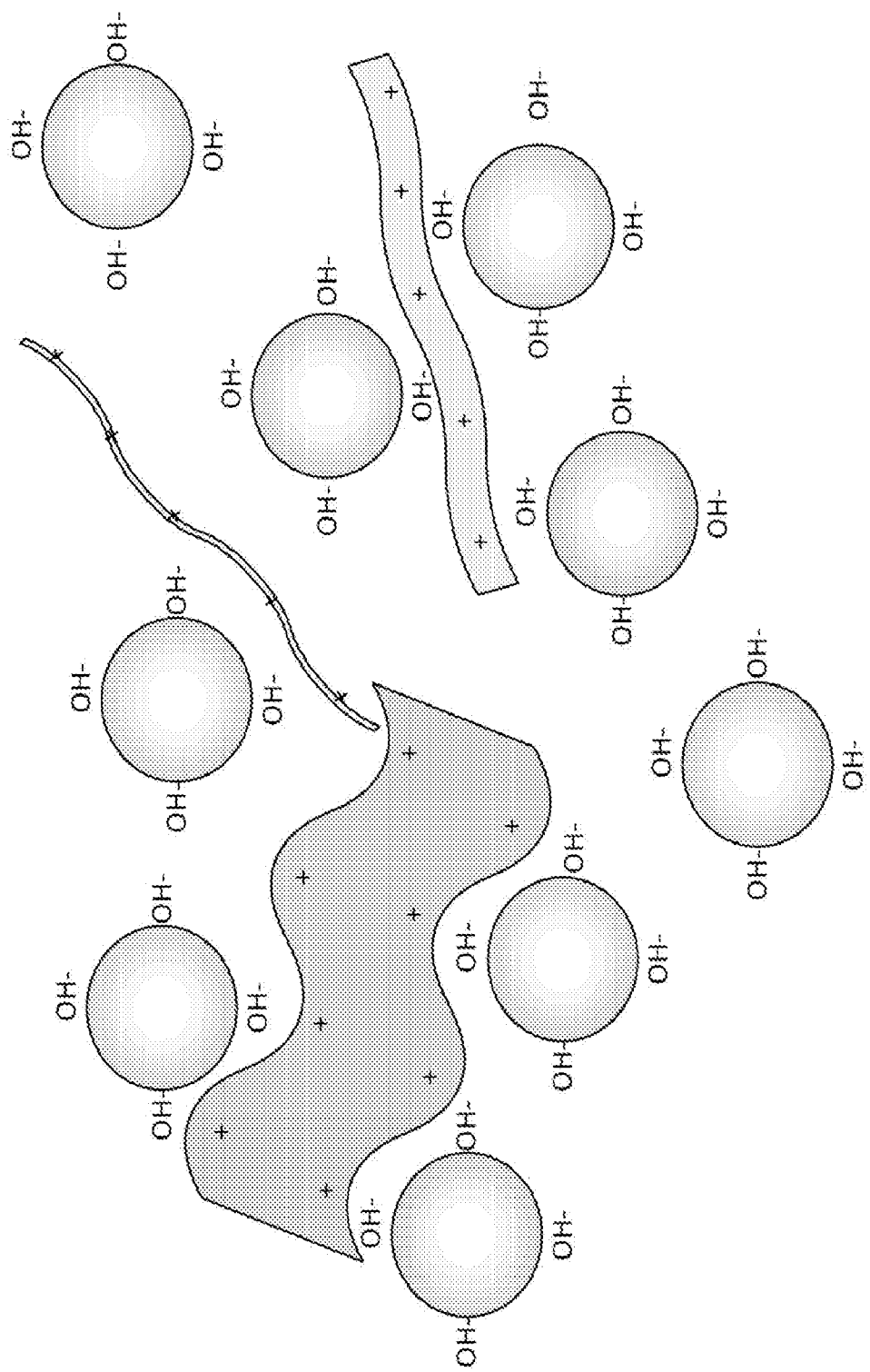
FIG. 11 illustrates the surface charge attraction of the nanobubbles to contaminant particles such as microplastics in water.

FIG. 11 illustrates the surface charge attraction of the nanobubbles to particles and microplastics in water. Nanobubbles are initially diffused as micro-nanobubbles in the 50-micron range and shrink in size based on the pressure of the gas diffused and the interface of ions at the surface of the bubbles forming radicals such as OH—. This phenomenon of the accumulation of radicals such as the hydroxyl radical OH— which creates a negative charge on the surface of the bubble. The nanobubbles will then become attracted to positive charged particles in the water and accumulate on or adhere to the particle surface. It is known that a majority of microplastics will carry a positive surface charge and therefore, it has been shown that this adhering of nanobubbles on the surface of these particle will increase the overall particle size and cause an agglomeration with other particles increasing the overall mass and buoyancy of the particles.

Figure 12A:
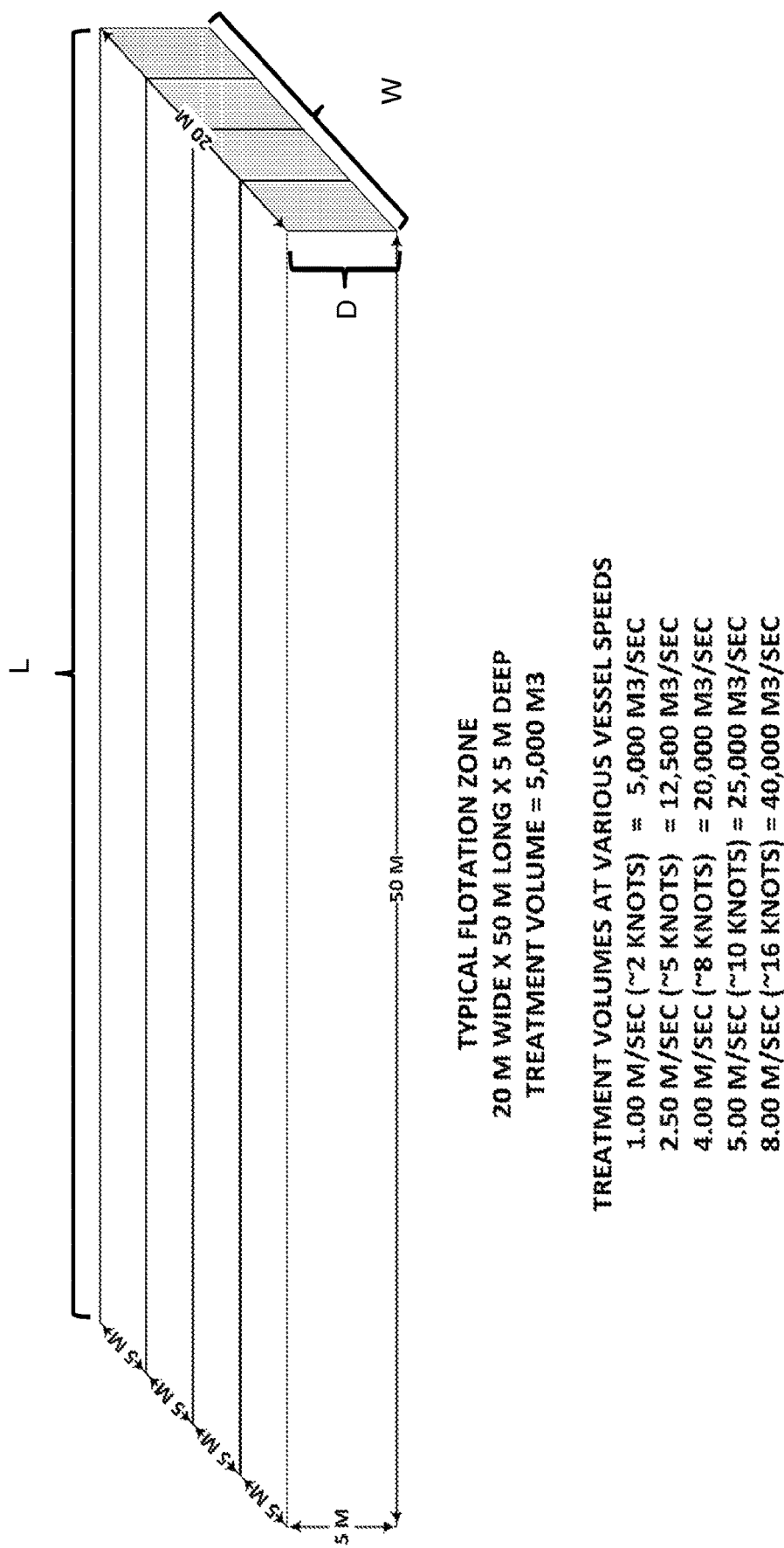
FIG. 12A provides an illustration of an example treatment zone as defined for embodiments of the treatment system.
Figure 12B:
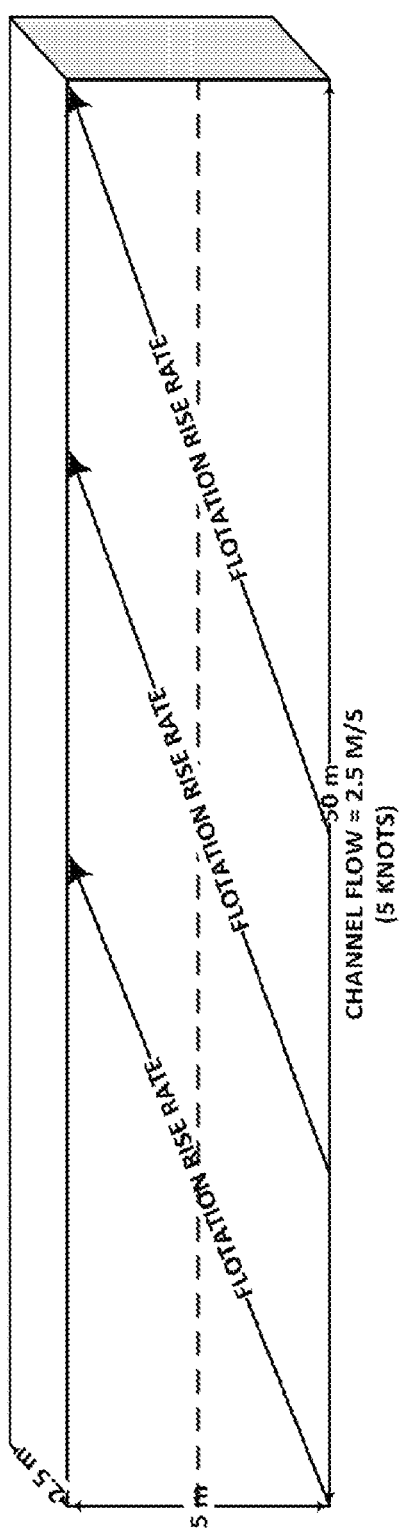
FIGS. 12B and 12C provide graphical illustrations of the impact of example relationships between the flow rate (channel flow), the rise rate, the depth, the width and the treatment (flotation) zone length.
Figure 12C:
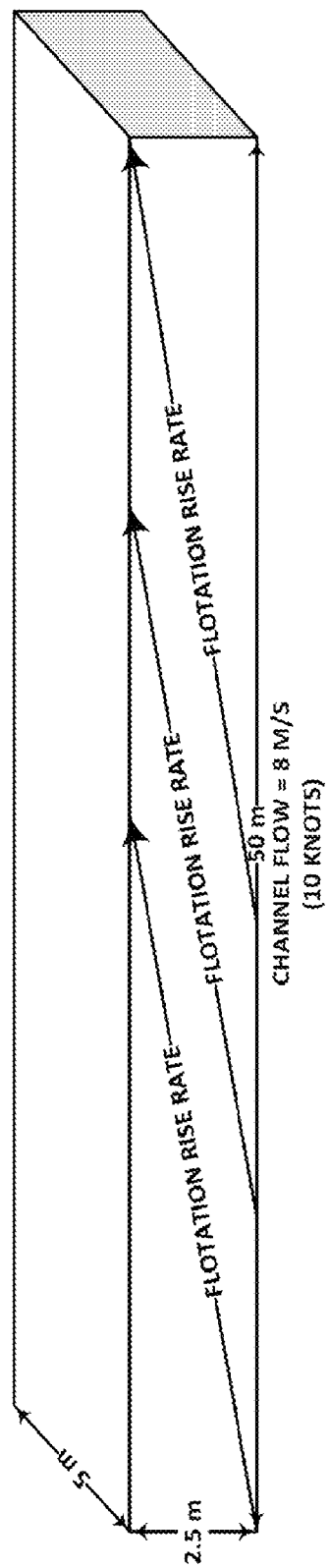
Figure 12D:
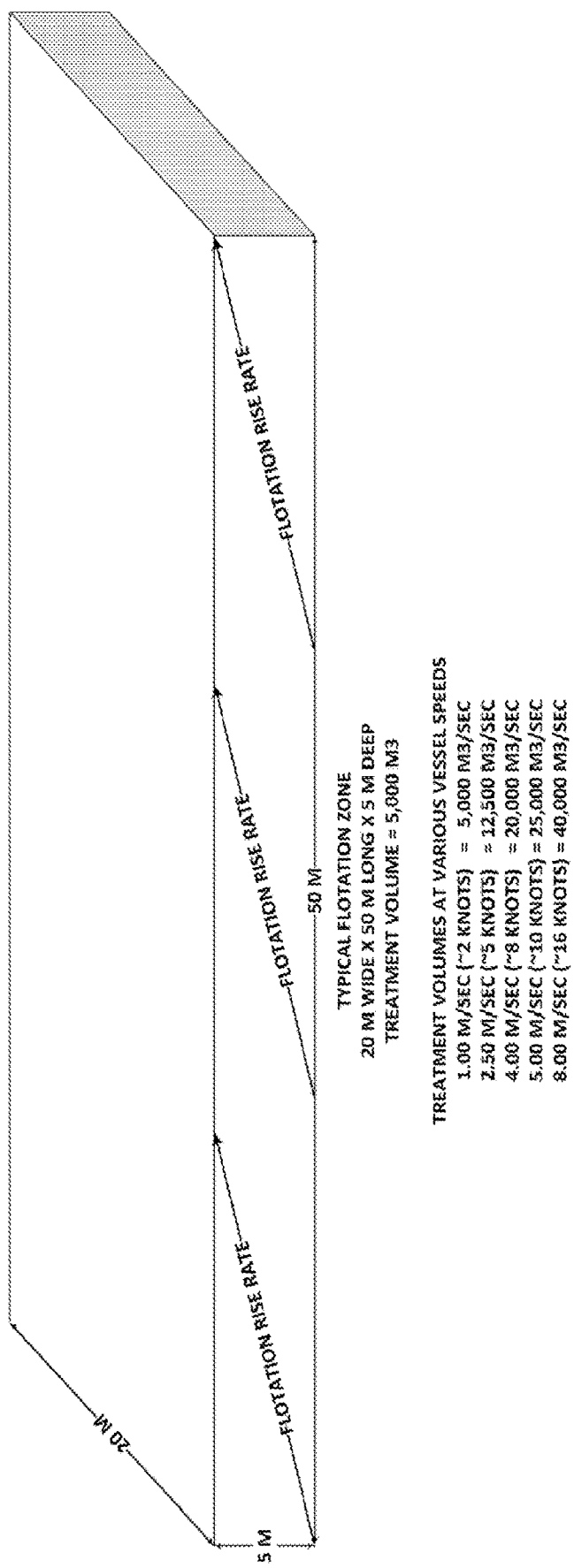
FIG. 12D provides an illustration of a typical treatment (flotation) zone and the impact of different flow rates on the treatment zone length and treatment volumes.

FIGS. 12A-12D illustrate features of example embodiments of the liquid treatment system to remove contaminants from varying flow rates of water. As shown in FIG. 12A, the treatment zone of the liquid is the area defined by the width W, the depth D and the length L of the body of liquid flowing through the treatment system. As described herein, the width W is generally the width of one or more channels, the depth D is generally the depth of the deepest nanobubble infuser nozzle infusing nanobubbles and larger bubbles into the body of liquid and the length L is generally the length of the channel that treats the liquid by removing contaminants. The length L is defined by the furthest skimmer with a skimmer blade skims contaminants off of the surface of the liquid (see FIG. 1B). Because the skimmer blade is part of one or more flotation skimmer cassettes, the length L is configurable and can be increased by moving the flotation skimmer cassettes further from the entrance of the treatment area. As is illustrated in FIGS. 12B-12D, this configurable and variable length of the treatment zone allows the liquid treatment system to accommodate a wide range of flow rates into the treatment system. The length L is generally defined by the rate of flow of the liquid and the rise rate of the nanobubble and contaminant agglomerations (see FIG. 13). FIG. 12B illustrates the general impact on the length of the treatment zone given a depth of 5 meters, a flow rate of 2.5 m/sec and a rise rate. FIG. 12C illustrates the general impact on the length of the treatment zone given a depth of 2.5 meter, a flow rate of 5 m/sec and a given rise rate. FIG. 12D illustrates an example treatment zone with a depth of 5 meter, a width of 20 meter and a length dependent upon the rise rate and the flow rate of the liquid.

Conceptually, because the length of treatment zone is generally limited by the positioning of the flotation skimmer cassette assembly, the flow rate could be infinite given a positioning of the flotation skimmer cassette assembly at an infinite length from the start of the treatment zone. This conceptual ability to accommodate infinite flow rates also allows infinite volumetric flow rates by increasing the width of the treatment zone. The ability to elongate and widen the treatment zone and accommodate different flow rates is also enhanced by embodiments of the treatment system that float in a large body of liquid. For example, a vessel configured with the treatment system has much more ability to lengthen the treatment zone at sea than a land-based treatment facility that is hampered by geography. The treatment system's ability to vary the rise rate of nanobubble and contaminant agglomerations further increase the system's ability to accommodate a wide range of flow rates. Together, these features of the treatment system are particularly helpful in allowing the system to treat very high flow rates by increasing the length of the treatment zone and/or increasing the rise rate of the bubble blanket.

The rise rate of the bubble blanket impacts the length of the treatment zone by varying the rate that the large bubble blanket influences the nanobubble and contaminant agglomerations to rise the body of liquid of the treatment zone. The rise rate is generally configured to coincide with the flow rate of the liquid and the length of the flotation skimmer cassette assembly from the start of the treatment zone. This allows the nanobubble and contaminant agglomerations to rise from the depth D to the surface of the liquid before the end of the treatment zone where the nanobubble and contaminant agglomerations can be removed by the skimmer blade. However, it is understood that configurations of the treatment system could have a rise rate that is configured to have nanobubble and contaminant agglomerations rise before or after the last flotation skimmer cassette assembly. For those configurations with rise rates calculated to have nanobubble and contaminant agglomerations rise after the last skimmer blade, it is understood that with other variables equal, the percentage removal of contaminants will likely be less than if the nanobubble and contaminant agglomerations rise before or at the last skimmer blade.

FIG. 13A illustrates the bubble rise rates at various vessel speeds (defining liquid flow rate) at a treatment zone depth of 5 meters and the resulting length of the treatment (flotation) zone. This graphical representation shows the length of the treatment zone based on a nominal bubble rise rate of 0.25 m/sec. Example embodiments may have the follow ranges of characteristics related to the rise rate: Vessel Speed of about 2-16 knots or about 1-8 m/sec (e.g., 5 knots for optimal design speed); Rise Rate of about 0.25-0.40 meters per second; and Nanobubble Diffusion Depth Range of about 1-10 meters (e.g., 5 meters for a vessel speed of the 8 knots). The nanobubble agglomerated contaminant removal efficiency should virtually be the same for various speeds as long as the nanobubble agglomerated contaminants captured by the large bubble blanket plume is able to rise to the surface at the given vessel speed within the length of the vessel's treatment (flotation) zone. Hence the faster the vessel speed, the longer the vessel's treatment (flotation) zone will need to be to capture the plume of the flotation blanket. The slower the vessel speed, the higher the density of nanobubbles and large bubbles. Therefore, at faster speeds, higher nanobubble and large bubble diffusion will be required to maintain the optimal density of the flotation blanket.

The features of the disclosed treatment systems are exhibited at any flow rate of liquid through the treatment zone. For illustration purposes only, and not for limitation, FIG. 13A shows example relationships of flow rates (meters per second and knots), large bubble blanket rise rates of about 0.25 m/sec (meters per second) from a depth of 5 meters and the resulting treatment (flotation) zone lengths. In one example embodiment, the treatment system may be configured to treat liquids at a volumetric flow rate of greater than about 5.14 m$^3$/sec (cubic meters per second). This embodiment represents a per meter width treatment zone with a depth of 5 meters and a flow rate of about 1 m/sec (about 2 knots). For this embodiment, the rise rate may be about 0.25 m/sec and the resulting length will be at least about 20 meters (see Line A). In another example embodiment, the treatment system may be configured to treat liquids at a volumetric flow rate of about 12.86 m$^3$/sec. This embodiment represents a per meter width treatment zone with a depth of 5 meters and a flow rate of about 2.5 m/sec (about 5 knots). For this embodiment, the rise rate may be about 0.25 m/sec and the projected length will be at least about 51 meters (see Line C). In another illustrative example embodiment, the treatment system may be configured to treat liquids at a volumetric flow rate of about 25.72 m$^3$/sec. This embodiment represents a per meter width treatment zone with a depth of 5 meters and a flow rate of about 5 m/sec (about 10 knots). For this embodiment, the rise rate may be about 0.25 m/sec and the projected length will be at least about 102 meters (see Line E).

FIG. 13B shows example relationships of flow rates (meters per second and knots), large bubble blanket rise rates of 0.25 m/sec from a depth of 2.5 meters and the resulting treatment (flotation) zone lengths. In one example embodiment, the treatment system may be configured to treat liquids at a volumetric flow rate of greater than about 2.57 m$^3$/sec. This embodiment represents a per meter width treatment zone with a depth of 2.5 meters and a flow rate of about 1 m/sec (about 2 knots). For this embodiment, the rise rate may be about 0.25 m/sec and the resulting length will be at least about 10 meters (see Line A). In another example embodiment, the treatment system may be configured to treat liquids at a volumetric flow rate of 6.43 m$^3$/sec. This embodiment represents a per meter width treatment zone with a depth of 2.5 meters and a flow rate of about 2.57 m/sec (about 5 knots). For this embodiment, the rise rate may be about 0.25 m/sec and the length will be at least about 25 meters (see Line C). In another illustrative example embodiment, the treatment system may be configured to treat liquids at a volumetric flow rate of 12.86 m$^3$/sec. This embodiment represents a per meter width treatment zone with a depth of 2.5 meters and a flow rate of about 5 m/sec (about 10 knots). For this embodiment, the rise rate may be about 0.25 m/sec and the projected length will be at least about 51 meters (see Line E).

Similar to FIGS. 13A and 13B, FIGS. 14A and 14B illustrate example relationships between the flow rate and the treatment (flotation) zone's length and depth given a bubble rise rate of 0.4 m/sec. As is shown, flow rates may range from 1 m/sec to greater than 8 m/sec. Greater flow rates are also possible.

Figure 15A:
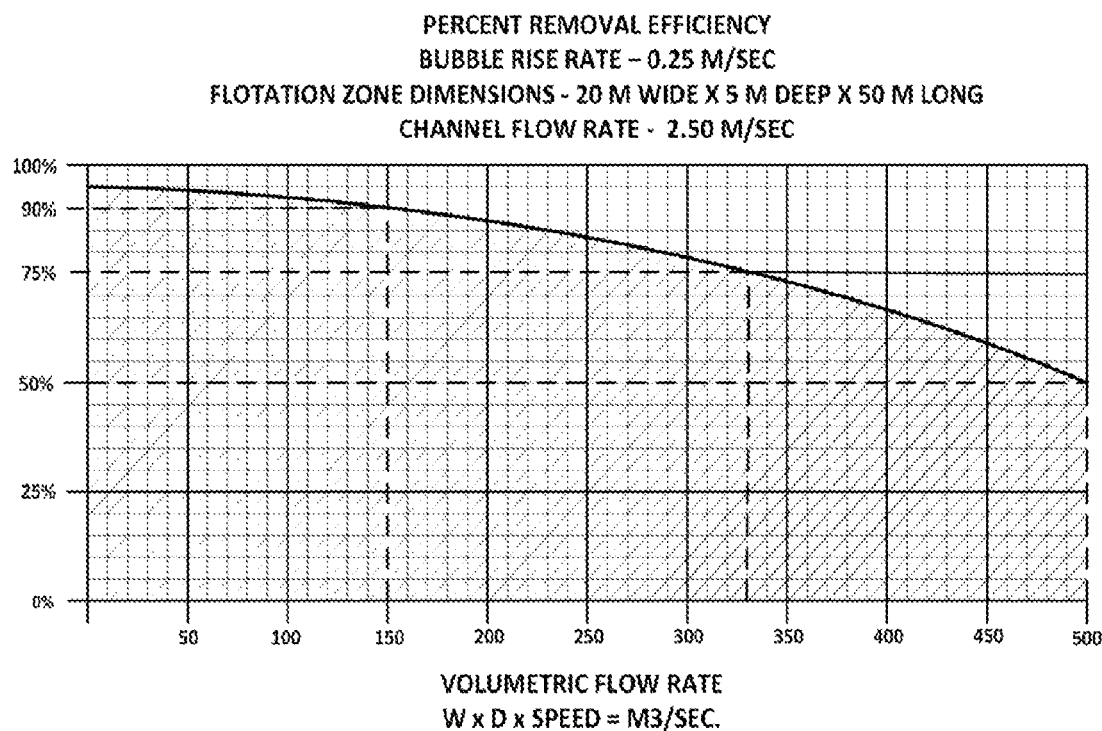
FIGS. 15A-15D illustrate example contaminant removal efficiency at various channel flows speeds, channel depth and bubble rise rates of 0.25 m/sec.
Figure 15B:
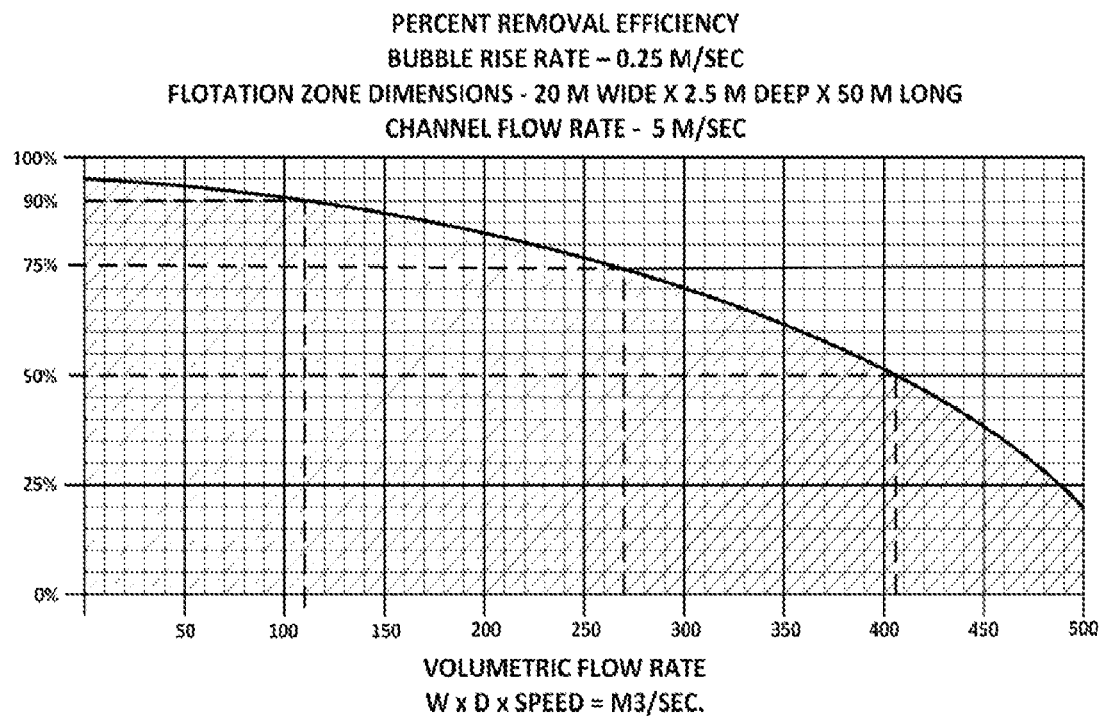
Figure 15C:
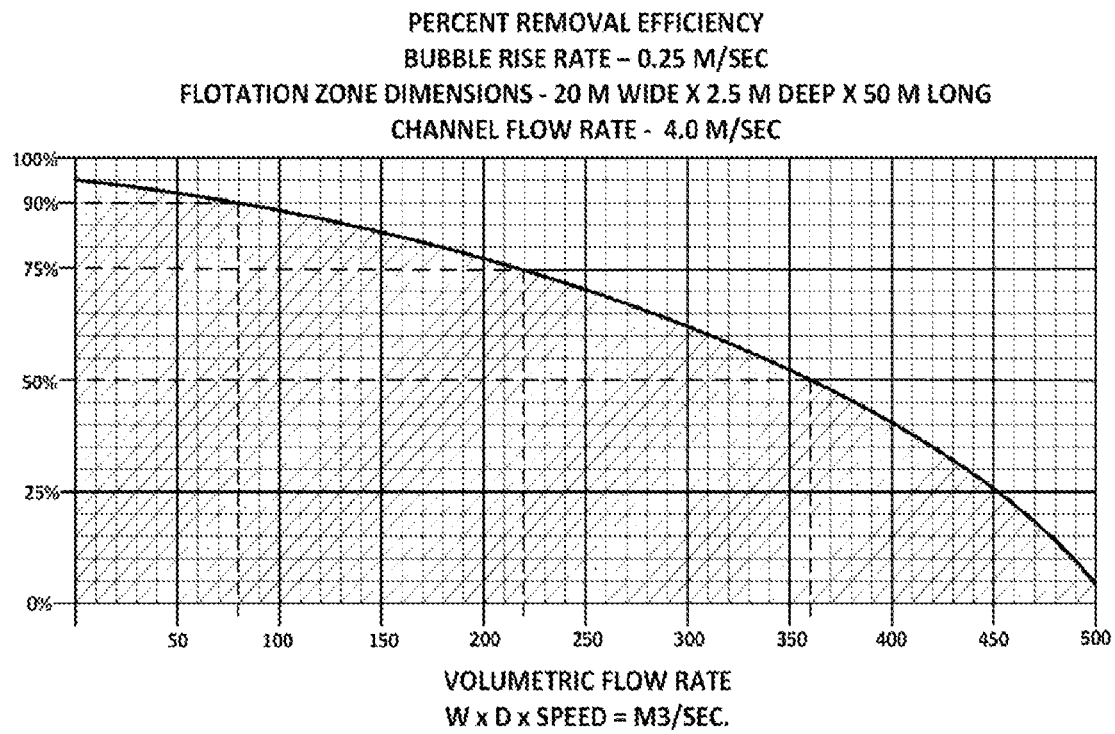
Figure 15D:
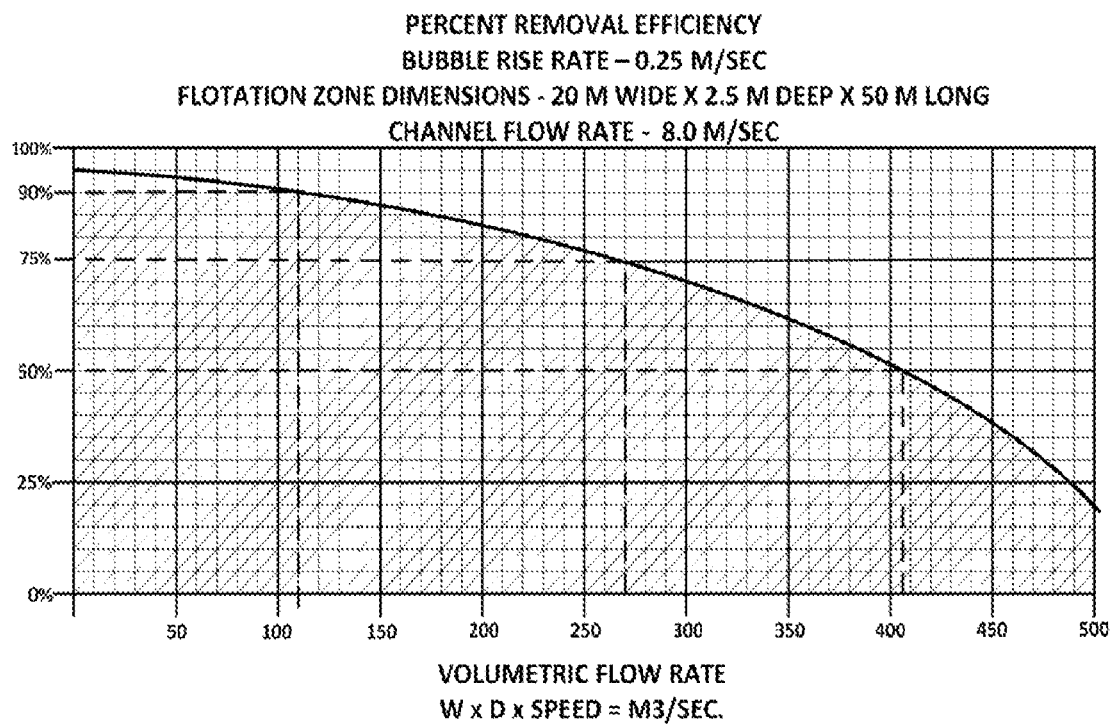

FIGS. 15A-15D illustrate example contaminant removal efficiency at various channel flows speeds, channel depth and bubble rise rates of 0.25 m/sec. The removal percentage reflects the percentage removal of contaminants less than about 25.0 mm from the liquid flow exiting the end of the treatment zone as compared to the level of contaminant less than 25.0 mm entering the treatment zone. In some embodiments the percentage removal of contaminants is a percentage removal of contaminants less than about 10.0 mm, in some embodiments, the percentage removal of contaminants is a percentage removal of contaminants less than about 2.0 mm in size, and in some embodiments, the percentage removal of contaminants is a percentage removal of contaminants less than about 1.0 mm in size. In some embodiments, the contaminants are microplastics. As shown, removal efficiencies for these configurations may vary based on volumetric flow rate. FIG. 15A shows a graph of removal rates per volumetric flow rates with a flow rate of 2.5 m/sec, a rise rate of 0.25 m/sec and a treatment (flotation) zone having a 20 meter width, a 5 meter depth and a 50 meter length. For example, a percentage removal of greater than 90 percent can be obtained at a volumetric flow rate of up to about 150 m$^3$/sec; a percentage removal of greater than 75 percent may be obtained at a volumetric flow rate of up to about 330 m$^3$/sec; and a percentage removal of greater than 50 percent may be obtained at a volumetric flow rate of up to about 500 m$^3$/sec. FIG. 15B shows a graph of removal rates per volumetric flow rates with a flow rate of 5 m/sec, a rise rate of 0.25 m/sec and a treatment (flotation) zone having a 20 meter width, a 2.5 meter depth and a 50 meter length. For example, a percentage removal of greater than 90 percent can be obtained at a volumetric flow rate of up to about 110 m$^3$/sec; a percentage removal of greater than 75 percent may be obtained at a volumetric flow rate of up to about 270 m$^3$/sec; and a percentage removal of greater than 50 percent may be obtained at a volumetric flow rate of up to about 410 m$^3$/sec. FIG. 15C shows a graph of removal rates per volumetric flow rates with a flow rate of 4 m/sec, a rise rate of 0.25 m/sec and a treatment (flotation) zone having a 20 meter width, a 2.5 meter depth and a 50 meter length. For example, a percentage removal of greater than 90 percent can be obtained at a volumetric flow rate of up to about 80 m$^3$/sec; a percentage removal of greater than 75 percent may be obtained at a volumetric flow rate of up to about 220 m$^3$/sec; and a percentage removal of greater than 50 percent may be obtained at a volumetric flow rate of up to about 360 m$^3$/sec. FIG. 15D shows a graph of removal rates per volumetric flow rates with a flow rate of 8 m/sec, a rise rate of 0.25 m/sec and a treatment (flotation) zone having a 20 meter width, a 2.5 meter depth and a 50 meter length. For example, a percentage removal of greater than 90 percent can be obtained at a volumetric flow rate of up to about 110 m$^3$/sec; a percentage removal of greater than 75 percent may be obtained at a volumetric flow rate of up to about 270 m$^3$/sec; and a percentage removal of greater than 50 percent may be obtained at a volumetric flow rate of up to about 410 m$^3$/sec.

Figure 16A:
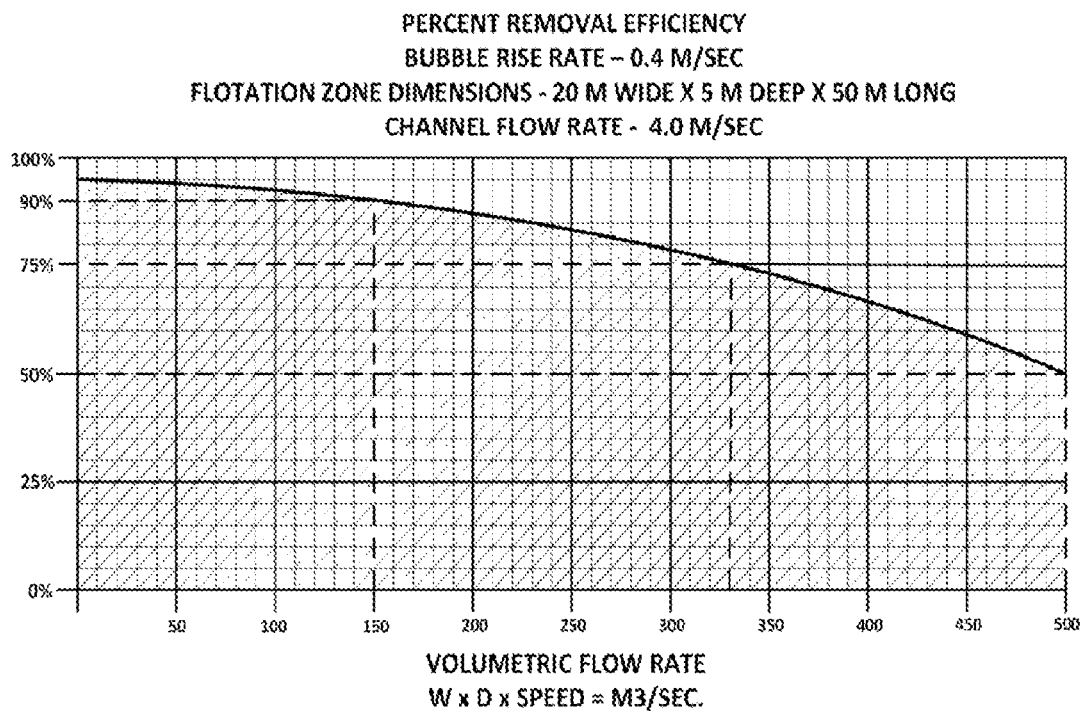
FIGS. 16A and 16B illustrate example contaminant removal efficiency at various channel flows speeds, channel depth and bubble rise rates of 0.4 m/sec.
Figure 16B:
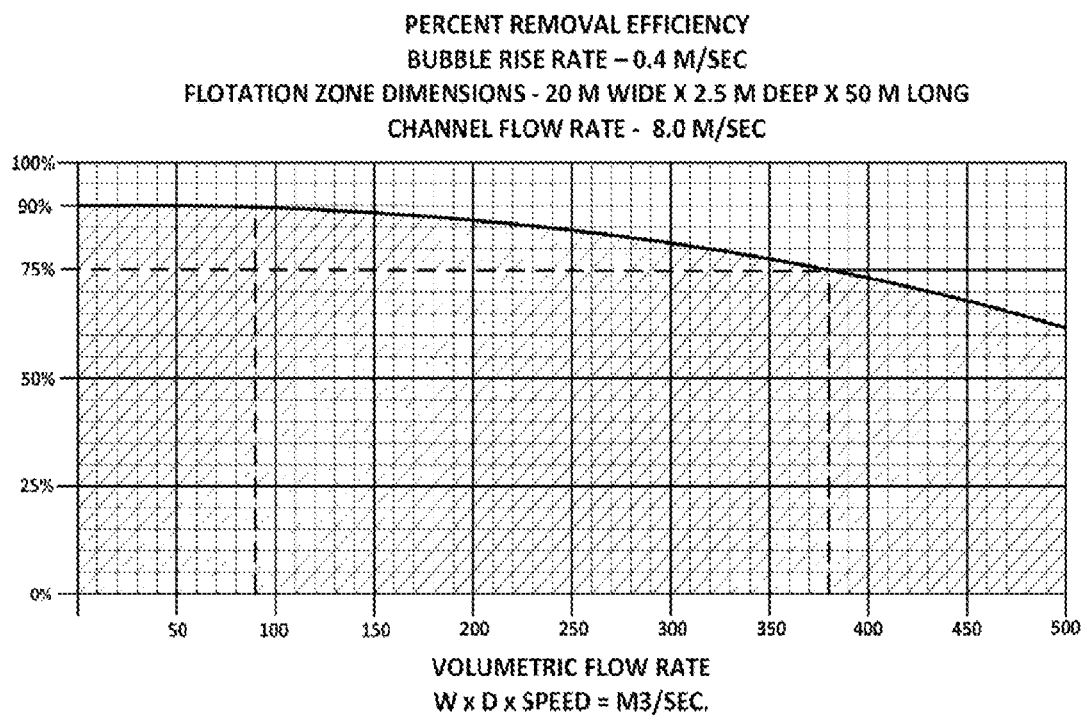

FIGS. 16A and 16B illustrate example contaminant removal efficiency at various channel flows speeds, various channel depths and bubble rise rates of 0.4 m/sec. FIG. 16D shows a graph of removal rates per volumetric flow rates with a flow rate of 4 m/sec, a rise rate of 0.4 m/sec and a treatment (flotation) zone having a 20 meter width, a 5 meter depth and a 50 meter length. For example, a percentage removal of greater than 90 percent can be obtained at a volumetric flow rate of up to about 150 m$^3$/sec; a percentage removal of greater than 75 percent may be obtained at a volumetric flow rate of up to about 330 m$^3$/sec; and a percentage removal of greater than 50 percent may be obtained at a volumetric flow rate of up to about 500 m$^3$/sec. FIG. 16B shows a graph of removal rates per volumetric flow rates with a flow rate of 8 m/sec, a rise rate of 0.4 m/sec and a treatment (flotation) zone having a 20 meter width, a 2.5 meter depth and a 50 meter length. For example, a percentage removal of greater than 90 percent can be obtained at a volumetric flow rate of up to about 190 m³/sec; and a percentage removal of greater than 75 percent may be obtained at a volumetric flow rate of up to about 380 m³/sec.

The percentage removal of contaminants within the treatment zone may also be any removal rate depending on the configuration of the treatment system. Generally, the percentage removal is based on the exposure of the contaminants to the nanobubbles and the larger bubble blanket. The more contaminants that rise in the treatment zone, the more contaminants may be removed. The amount of contaminants able to rise depends on the flow rate of the liquid, the rise rate of the larger bubble blanket and the length and depth of the treatment zone. Because all of these can be varied in different embodiments, the result is a configurable treatment system. Embodiments of the treatment system can remove any range of contaminants over any flow rate as long as the rise rate and the treatment zone's depth and length are properly matched to the flow rate. Similarly, volumetric flow rates may be configurable based on varying the width of the treatment zone. As a result, in some embodiments, the contaminant removal from the liquid can be at least about 30 percent removal, in some embodiments at least about 50 percent removal, in some embodiments at least about 70 percent removal, and in some embodiments at least about 90 percent removal. These removal efficiency rates can be over any flow rate as long as the rise rate and the treatment zone depth and length are properly matched. These efficiency rates can also be over any volumetric flow rate as long as the width of the treatment zone is also properly matched.

Figure 17A:
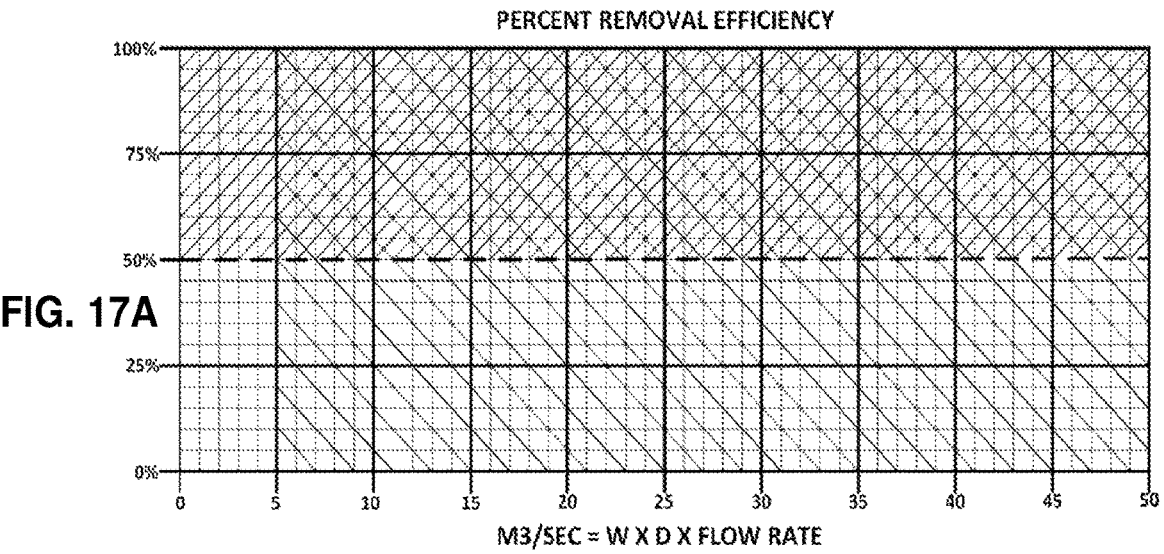
FIG. 17A-17C illustrate example removal efficiencies at various liquid flow rates for example embodiments of a liquid treatment system.

As an example, and as shown in FIG. 17A, the treatment system may be configured to remove any percentage of contaminants at a volumetric flow rate of greater than about 5 m³/sec (e.g., flow rate 2 knots and 5 meter treatment zone depth) shown as the area to the right of 5 m³/sec on the graph. Additionally, the treatment system may be configured to remove more than about 50 percent of contaminants at any volumetric flow rate shown as the area above 50 percent on the graph. The treatment system may be configured to remove more than about 50 percent of contaminants at a volumetric flow rate of more than about 5 m³/sec shown as the overlapping area of the two areas of the graph.

Figure 17B:
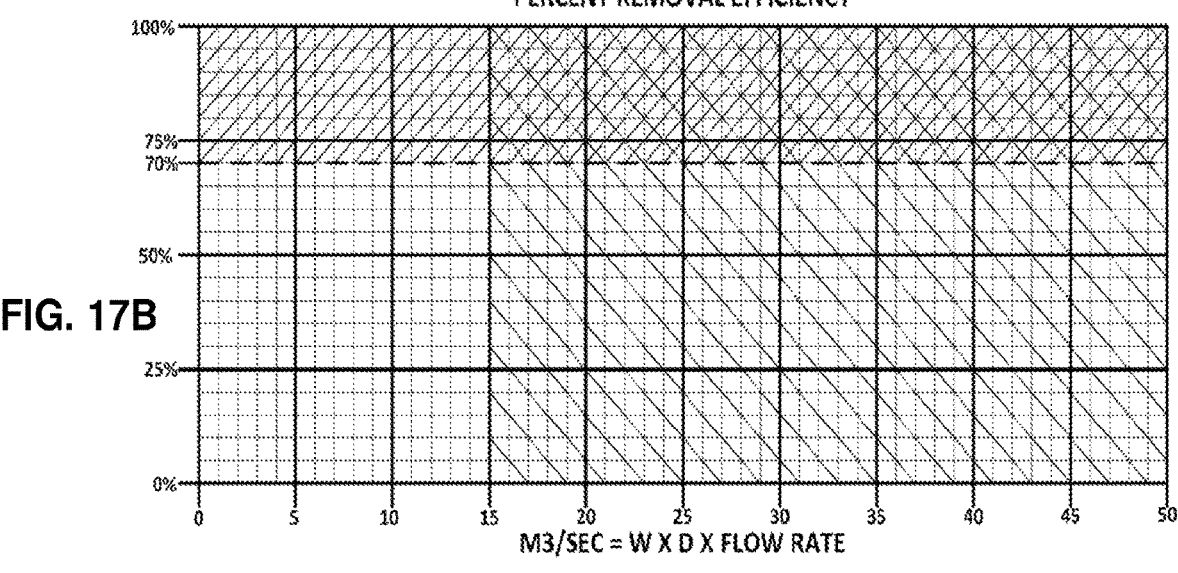

As another example, and as shown in FIG. 17B, the treatment system may be configured to remove any percentage of contaminants at a volumetric flow rate of greater than about 15 m³/sec (e.g., flow rate 6 knots and 5 meter treatment zone depth) shown as the area to the right of 15 m³/sec on the graph. Additionally, the treatment system may be configured to remove more than about 70 percent of contaminants at any volumetric flow rate shown as the area above 70 percent on the graph. The treatment system may be configured to remove more than about 70 percent of contaminants at a volumetric flow rate of more than about 15 m³/sec shown as the overlapping area of the two areas of the graph.

Figure 17C:
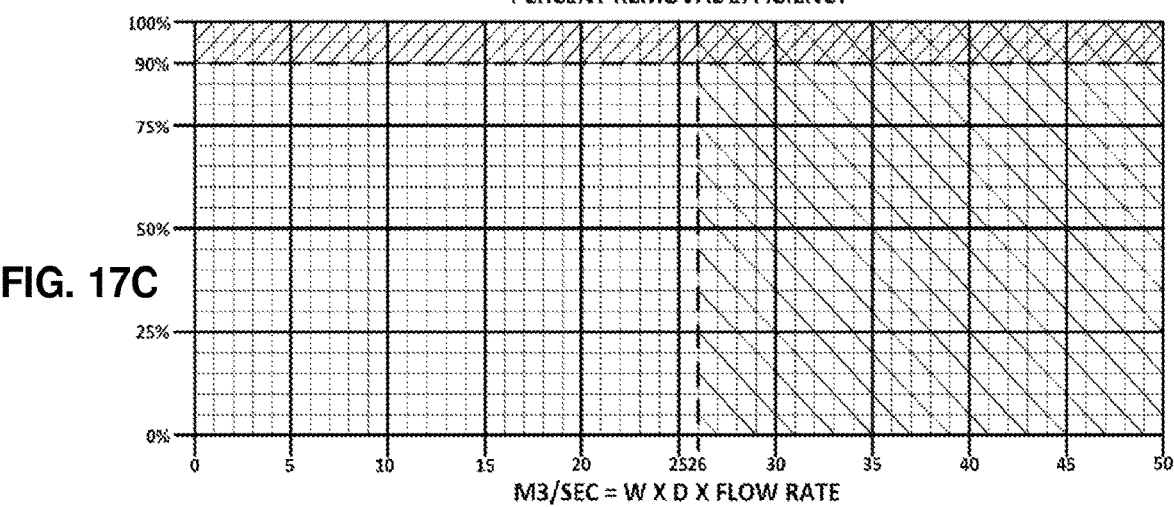

As another example, and as shown in FIG. 17C, the treatment system may be configured to remove any percentage of contaminants at a volumetric flow rate of greater than about 26 m³/sec (e.g., flow rate 10 knots and 5 meter treatment zone depth) shown as the area to the right of 26 m³/sec on the graph. Additionally, the treatment system may be configured to remove more than about 90 percent of contaminants at any volumetric flow rate shown as the area above 90 percent on the graph. The treatment system may be configured to remove more than about 90 percent of contaminants at a volumetric flow rate of more than about 26 m³/sec shown as the overlapping area of the two areas of the graph.

It is also understood that the above volumetric flow rates are based on a per-meter width of the treatment zone. By increasing the width of the treatment channel and the treatment zone, the volumetric flow rates may be increased. This is particularly helpful when the treatment system is a floating vessel that can have a very wide width and therefore the treatment channels can be very wide.

It is also understood that the above volumetric flow rates could be defined in a per-meter width of the treatment zone and a per-meter depth of the treatment zone. For the above examples that use a depth of 5 meters, dividing the volumetric flow rates by the example depth of 5 meters would define the volumetric flow rate in both a per-meter width and a per-meter depth of the treatment zone.

It is also understood that for the above embodiments having a depth of 5 meters, by increasing and decreasing the depth, the above volumetric flow rates may be correspondingly increased and decreased accordingly.

In addition to configurations being able to accommodate varying volumetric flow rates, and in particular fast volumetric flow rates, embodiments of the treatment system can operate continuously. This is particularly helpful for embodiments configured on a floating vessel that treat the body of liquid the vessel is floating on. One particular example embodiment is an ocean vessel having a treatment system configured to remove microplastic contaminants from the ocean over an extended period of time.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

What is claimed is:

1. A treatment system to remove contaminants from a liquid flow, the treatment system comprising:
    a treatment zone defined by a channel and a depth;
    the channel defined by one or more channel guide configured to channel the liquid flow from an entrance of the treatment zone to an exit of the treatment zone;
    the liquid flow comprising contaminants having a positive charge;
    a nanobubble diffuser system configured to be submerged in the liquid flow to the depth;
    the depth defining a bottom of the treatment zone;
    the nanobubble diffuser system configured to diffuse a plurality of nanobubbles having a negative charge into the liquid flow whereby a portion of the plurality of nanobubbles adhere to a portion of the contaminants as a nanobubble and contaminant agglomeration and the nanobubble and contaminant agglomeration is urged to float towards a surface of the liquid flow in the treatment zone;
    a larger bubble diffuser system positioned proximal to the bottom of the treatment zone and in a downstream direction of the liquid flow from the nanobubble diffuser system;
    the larger bubble diffuser system configured to diffuse a plurality of large bubbles in the liquid flow whereby a portion of the plurality of large bubbles create a floating blanket of large bubbles to increase a rise rate of the nanobubble and contaminant agglomeration; and a skimmer cassette assembly configured to remove the nanobubble and contaminant agglomeration from the liquid flow whereby a volume of contaminants in the liquid flow is a lower volume at the exit of the treatment zone than at the entrance of the treatment zone.

2. The treatment system of claim 1 wherein:
the liquid flow is from a larger liquid source; and
the channel guide and the nanobubble diffuser system are operably coupled to a vessel floating in the larger liquid source.

3. The treatment system of claim 1 wherein:
the liquid flow is from a larger liquid source;
a rate of liquid flow through the channel is defined by a movement of the channel through the larger liquid source; and
a position of the skimmer cassette assembly relative to the nanobubble diffuser system defined by a rise rate of the nanobubbles, a rate of liquid flow through the channel and the depth.

4. The treatment system of claim 1 wherein a spacing of the nanobubble diffuser system relative to the skimmer cassette assembly is based on a rise rate of the nanobubble and contaminant agglomeration.

5. The treatment system of claim 1 wherein the skimmer cassette assembly comprises:
a skimmer blade coupled to a skimmer drive whereby the skimmer drive is configured to move the skimmer blade in a relative movement to the liquid flow;
the relative movement of the skimmer blade is in an opposite direction to the liquid flow; and
the skimmer blade is configured to extend from the surface of the liquid flow to a skimming depth whereby the skimmer blade engages the nanobubble and contaminant agglomeration from the liquid flow to the skimming depth and moves a portion of the contaminants in the liquid flow in the opposite direction to the liquid flow.

6. The treatment system of claim 5 wherein the skimmer cassette assembly further comprises a skimmer beach assembly having an inclined beach surface whereby the portion of the contaminants are moved up the inclined beach surface and out of the liquid flow as the skimmer blade moves over the inclined beach surface.

7. The treatment system of claim 6 wherein the skimmer beach assembly further comprises:
an augur channel in an inclined beach surface whereby the portion of the contaminants are deposited in the augur channel as the skimmer blade moves over the inclined beach surface;
an augur positioned in the augur channel configured to remove the portion of the contaminants from the augur channel; and
a wave suppression edge formed into a leading edge of the skimmer beach assembly to suppress turbulence in the treatment zone.

8. The treatment system of claim 1 wherein:
the contaminants comprise:
microplastics having a size of less than about 25.0 mm, and
other contaminants having a size greater than about 25.0 mm; and
the liquid flow comprises a flow of a water-based liquid.

9. The treatment system of claim 1 wherein:
the contaminants comprise microplastics having a size of less than about 2.0 mm; and
the liquid flow comprises a flow of a water-based liquid.

10. The treatment system of claim 1 further comprising:
a plurality of large contaminants in the liquid flow;
one or more trash screens positioned in an upstream direction from the nanobubble diffuser system whereby the one or more trash screens remove a portion of the large contaminants from the liquid flow; and
one or more band screens positioned in a downstream direction from the nanobubble diffuser system whereby the one or more band screens further remove a portion of the contaminants from the liquid flow.

11. The treatment system of claim 1 wherein:
a volumetric flow rate of liquid flow is greater than about 1 cubic meter per second for each meter width of the channel of the treatment zone and each meter depth of the treatment zone; and
a volume of the contaminants in the liquid flow at the exit of the treatment zone is at least about 50 percent lower than the volume of the contaminants in the liquid flow at the entrance of the treatment zone.

12. The treatment system of claim 11 wherein the depth of the treatment zone is about 5 meters.

13. The treatment system of claim 11 wherein the contaminants comprise microplastics having a size of less than about 25.0 mm.

14. The treatment system of claim 1 wherein:
a volumetric flow rate of liquid flow is greater than about 3 cubic meters per second for each meter width of the channel of the treatment zone and each meter depth of the treatment zone;
the contaminants comprise microplastics having a size of less than about 25.0 mm; and
a volume of the contaminant in the liquid flow at the exit of the treatment zone is at least about 90 percent lower than the volume of the contaminants in the liquid flow at the entrance of the treatment zone.

15. The treatment system of claim 14 wherein the depth of the treatment zone is about 5 meters.

16. The treatment system of claim 14 wherein the contaminants comprise microplastics having a size of less than about 25.0 mm.

17. A floating skimmer cassette assembly for use with a liquid treatment system to filter a liquid flow, the floating skimmer cassette assembly comprising:
a skimmer blade operationally coupled to one or more skimmer cassette pontoon whereby the skimmer blade is positioned near a surface of the liquid flow;
the skimmer blade operationally coupled to a skimmer drive whereby the skimmer drive is configured to move the skimmer blade in a relative movement to the liquid flow;
the relative movement of the skimmer blade is in an opposite direction to the liquid flow;
the skimmer blade is configured to extend from the surface of the liquid flow to a skimming depth whereby the skimmer blade engages a contaminant from the liquid flow at the skimming depth and moves the contaminant in the liquid flow in the opposite direction to the liquid flow; and
a skimmer beach assembly comprising:
an inclined beach surface whereby the contaminant is moved in the opposite direct to the liquid flow, up the inclined beach surface and out of the liquid flow as the skimmer blade moves over the inclined beach surface, and a wave suppression edge formed into a leading edge of the skimmer beach assembly to suppress turbulence in the liquid flow.

18. The floating skimmer cassette assembly of claim 17 wherein the skimmer beach assembly further comprises:

an augur channel in the inclined beach surface whereby the contaminant is deposited in the augur channel as the skimmer blade moves over the inclined beach surface; and an augur positioned in the augur channel and configured to remove the contaminant from the augur channel.

19. A configurable liquid treatment system for removing contaminants from a liquid flow, the configurable liquid treatment system comprising:

a treatment zone defined by a channel width, a depth and a length;

the channel width defined by one or more channel guide configured to channel the liquid flow from an entrance of the treatment zone to an exit of the treatment zone;

a nanobubble diffuser system configured to be submerged in the liquid flow to the depth;

the depth defining a bottom of the treatment zone;

a skimmer cassette assembly at a position from the entrance of the treatment zone and defining the length of the treatment zone;

the liquid flow comprising contaminants having a positive charge;

the nanobubble diffuser system configured to diffuse a plurality of nanobubbles having a negative charge into the liquid flow whereby a portion of the plurality of nanobubbles adhere to a portion of the contaminants as a nanobubble and contaminant agglomeration and the nanobubble and contaminant agglomeration is urged to float towards a surface of the liquid flow in the treatment zone;

a larger bubble diffuser system positioned proximal to the bottom of the treatment zone and in a downstream direction of the liquid flow from the nanobubble diffuser system;

the larger bubble diffuser system configured to diffuse a plurality of large bubbles in the liquid flow whereby a portion of the plurality of large bubbles create a floating blanket of large bubbles to increase a rise rate of the nanobubble and contaminant agglomeration; and the skimmer cassette assembly is configured to remove the nanobubble and contaminant agglomeration from the liquid flow whereby a volume of contaminants in the liquid flow is a lower volume at the exit of the treatment zone than at the entrance of the treatment zone.

20. The configurable liquid treatment system of claim 19 wherein a position of the skimmer cassette assembly relative to the nanobubble diffuser system is defined by a rise rate of the plurality of nanobubbles, a liquid flow rate of the liquid flow through the channel width and the depth.

21. The configurable liquid treatment system of claim 19 wherein the liquid flow is flowing at a volumetric flow rate of greater than about 1 cubic meter per second for each meter of the channel width of the treatment zone and each meter depth of the treatment zone.

22. The configurable liquid treatment system of claim 19 wherein the liquid flow is flowing at a volumetric flow rate of greater than about 3 cubic meters per second for each meter of the channel width of the treatment zone and each meter depth of the treatment zone.

23. The configurable liquid treatment system of claim 19 wherein:

the liquid flow is flowing at a volumetric flow rate of greater than about 1 cubic meter per second for each meter of the channel width of the treatment zone and each meter depth of the treatment zone;

the contaminants comprise microplastics having a size of less than about 25.0 mm; and the volume of contaminants in the liquid flow is at least about 50 percent lower at the exit of the treatment zone than at the entrance of the treatment zone.

24. The configurable liquid treatment system of claim 19 wherein:

the liquid flow is flowing at a volumetric flow rate of greater than about 3 cubic meters per second for each meter of the channel width of the treatment zone and each meter depth of the treatment zone;

the contaminants comprise microplastics having a size of less than about 25.0 mm; and the volume of contaminants in the liquid flow is at least about 90 percent lower in volume at the exit of the treatment zone than at the entrance of the treatment zone.

25. A filter ship that-comprising two or more hulls forming one or more channel where water contaminated with contaminants can be removed, the filter ship comprising:

a nanobubble diffuser system configured to disperse nanobubbles of air into a channeled water stream flowing between the two or more hulls to adhere a portion of the nanobubbles to a portion of the contaminants and create contaminants and nanobubble agglomerations;

the two or more hulls defining one or more channel;

a larger bubble diffuser system configured to disperse a blanket of larger air bubbles at a point downstream of the nanobubble diffuser system to increase a rise rate of the contaminants and nanobubble agglomerations; and wherein a ratio of contaminants and nanobubble agglomerations to that of the blanket of larger bubbles can be varied and controlled to adjust and control the rise rate of the contaminants and nanobubble agglomerations.

26. The filter ship of claim 25 further comprising:

one or more floating skimmer cassette assembly located within the one or more channel;

the one or more floating skimmer cassette assembly positioned downstream of the nanobubble diffuser system; and each of the one or more floating skimmer cassette assembly comprising:

a plurality of skimmer blades mounted on one or more chain with rotational motivity to skim contaminants from a surface of the water, one or more pontoon mounted on a support structure of the floating skimmer cassette assembly configured to float the one or more floating skimmer cassette assembly on the surface of the water, a skimmer beach to receive and dewater the skimmed contaminants, and a wave suppression edge formed into a leading edge of a skimmer beach to suppress incoming waves of the water for creation of a quiescent treatment zone for air flotation to occur.

27. The filter ship of claim 25 further comprising one or more band screens positioned downstream from the nanobubble diffuser system whereby the one or more band screens further remove a portion of the contaminants from the channeled water stream.

28. A treatment system to remove contaminants from a liquid flow, the treatment system comprising:
   a treatment zone defined by a channel and a depth;
   the channel defined by one or more channel guide configured to channel the liquid flow from an entrance of the treatment zone to an exit of the treatment zone;
   the liquid flow comprising contaminants having a positive charge;
   a nanobubble diffuser system configured to be submerged in the liquid flow to the depth;
   the depth defining a bottom of the treatment zone;
   the nanobubble diffuser system configured to diffuse a plurality of nanobubbles having a negative charge into the liquid flow whereby a portion of the plurality of nanobubbles adhere to a portion of the contaminants as a nanobubble and contaminant agglomeration and the nanobubble and contaminant agglomeration is urged to float towards a surface of the liquid flow in the treatment zone;
   a skimmer cassette assembly configured to remove the nanobubble and contaminant agglomeration from the liquid flow whereby a volume of contaminants in the liquid flow is a lower volume at the exit of the treatment zone than at the entrance of the treatment zone;
   the skimmer cassette assembly comprising:
      a skimmer blade coupled to a skimmer drive whereby the skimmer drive is configured to move the skimmer blade in a relative movement to the liquid flow,
      the relative movement of the skimmer blade is in an opposite direction to the liquid flow,
      the skimmer blade is configured to extend from the surface of the liquid flow to a skimming depth whereby the skimmer blade engages the nanobubble and contaminant agglomeration from the liquid flow to the skimming depth and moves a portion of the contaminants in the liquid flow in the opposite direction to the liquid flow,
      a skimmer beach assembly having an inclined beach surface whereby the portion of the contaminants are moved up the inclined beach surface and out of the liquid flow as the skimmer blade moves over the inclined beach surface, and
      a wave suppression edge formed into a leading edge of the skimmer beach assembly to suppress turbulence in the treatment zone; and
   wherein a spacing of the nanobubble diffuser system relative to the skimmer cassette assembly is based on a rise rate of the nanobubble and contaminant agglomeration.

29. The treatment system of claim 28 further comprising:
   an augur channel in an inclined beach surface whereby the portion of the contaminants are deposited in the augur channel as the skimmer blade moves over the inclined beach surface; and
   an augur positioned in the augur channel configured to remove the portion of the contaminants from the augur channel.

30. The treatment system of claim 28 further comprising:
   a larger bubble diffuser system positioned proximal to the bottom of the treatment zone and in a downstream direction of the liquid flow from the nanobubble diffuser system; and
   the larger bubble diffuser system configured to diffuse a plurality of large bubbles in the liquid flow whereby the plurality of large bubbles create a floating blanket of large bubbles to increase a rise rate of the nanobubble and contaminant agglomeration.

31. The treatment system of claim 28 wherein:
   a volumetric flow rate of liquid flow is greater than about 1 cubic meter per second for each meter width of the channel of the treatment zone and each meter depth of the treatment zone; and
   a volume of the contaminants in the liquid flow at the exit of the treatment zone is at least about 50 percent lower than the volume of the contaminants in the liquid flow at the entrance of the treatment zone.

32. A treatment system to remove contaminants from a liquid flow, the treatment system comprising:
   a treatment zone defined by a channel and a depth;
   the channel defined by one or more channel guide configured to channel the liquid flow from an entrance of the treatment zone to an exit of the treatment zone;
   the liquid flow comprising contaminants having a positive charge;
   the liquid flow further comprising a plurality of large contaminants in the liquid flow;
   a nanobubble diffuser system configured to be submerged in the liquid flow to the depth;
   the depth defining a bottom of the treatment zone;
   the nanobubble diffuser system configured to diffuse a plurality of nanobubbles having a negative charge into the liquid flow whereby a portion of the plurality of nanobubbles adhere to a portion of the contaminants as a nanobubble and contaminant agglomeration and the nanobubble and contaminant agglomeration is urged to float towards a surface of the liquid flow in the treatment zone;
   one or more trash screens positioned in an upstream direction from the nanobubble diffuser system whereby the one or more trash screens remove a portion of the large contaminants from the liquid flow;
   a skimmer cassette assembly configured to remove the nanobubble and contaminant agglomeration from the liquid flow whereby a volume of contaminants in the liquid flow is a lower volume at the exit of the treatment zone than at the entrance of the treatment zone; and
   one or more band screens positioned in a downstream direction from the nanobubble diffuser system whereby the one or more band screens further remove a portion of the contaminants from the liquid flow.

33. A treatment system to remove contaminants from a liquid flow, the treatment system comprising:
   a treatment zone defined by a channel and a depth;
   the channel defined by one or more channel guide configured to channel the liquid flow from an entrance of the treatment zone to an exit of the treatment zone;
   the liquid flow comprising contaminants having a positive charge;
   a nanobubble diffuser system configured to be submerged in the liquid flow to the depth;
   the depth defining a bottom of the treatment zone;
   the nanobubble diffuser system configured to diffuse a plurality of nanobubbles having a negative charge into the liquid flow whereby a portion of the plurality of nanobubbles adhere to a portion of the contaminants as a nanobubble and contaminant agglomeration and the nanobubble and contaminant agglomeration is urged to float towards a surface of the liquid flow in the treatment zone; and
   one or more band screens positioned in a downstream direction from the nanobubble diffuser system whereby the one or more band screens remove the nanobubble and contaminant agglomeration from the liquid flow whereby a volume of contaminants in the liquid flow is a lower volume at the exit of the treatment zone than at the entrance of the treatment zone.

34. The treatment system of claim 33 wherein:

the liquid flow further comprises a plurality of large contaminants in the liquid flow; and the treatment system further comprises one or more trash screens positioned in an upstream direction from the nanobubble diffuser system whereby the one or more trash screens remove a portion of the large contaminants from the liquid flow.

35. The treatment system of claim 33 further comprising a skimmer cassette assembly configured to further remove a portion of the contaminants from the liquid flow.

* * * * *